(12) United States Patent
Petersen

(10) Patent No.: US 7,472,759 B2
(45) Date of Patent: Jan. 6, 2009

(54) AERATOR WITH SHORTENED CORING HEAD DEPTH

(75) Inventor: Walter J. Petersen, Eden Prairie, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 11/975,277

(22) Filed: Oct. 18, 2007

(65) Prior Publication Data

US 2008/0041601 A1    Feb. 21, 2008

Related U.S. Application Data

(62) Division of application No. 11/474,651, filed on Jun. 26, 2006, now Pat. No. 7,293,612, which is a division of application No. 10/706,607, filed on Nov. 12, 2003, now Pat. No. 7,096,969.

(60) Provisional application No. 60/425,375, filed on Nov. 12, 2002.

(51) Int. Cl.
*A01B 45/00* (2006.01)
*A01B 45/02* (2006.01)
*A01B 33/00* (2006.01)
*A01B 35/00* (2006.01)
*A01B 39/00* (2006.01)

(52) U.S. Cl. .............. 172/22; 172/75; 172/93; 172/94; 172/95; 172/101; 172/123; 172/125

(58) Field of Classification Search .......... 111/21, 111/22, 75, 91–96, 101, 110, 111, 118, 123, 111/125
See application file for complete search history.

(56) References Cited

U.S. PATENT DOCUMENTS 6,041,869 A * 3/2000 Lewis et al. .............. 172/21

* cited by examiner

*Primary Examiner*—Christopher J. Novosad
(74) *Attorney, Agent, or Firm*—James W. Miller

(57) ABSTRACT

A walk aerator comprises a frame supported by a plurality of ground engaging wheels, the frame carrying a coring head having a plurality of side-by-side tine assemblies. The wheels define a wheelbase which is substantially equal to or less than the width of a coring swath and the wheels are located in advance of the coring head to keep the wheels from passing over the holes or soil cores left in any preceding coring swathes formed by the aerator. The vertical position of the coring head is adjustable up and down as the ground contour changes to keep hole depth substantially constant. The tine assemblies are reciprocated by a single crankshaft driven by a single pulley, the crankshaft being assembled from multiple crank arms that are splined and bolted together. Sealed bearings connect drive arms that drive the tine assemblies to the crankshaft. The crankshaft can be disassembled to allow the sealed drive arm bearings to be replaced. Integral core deflectors are used on the drive arms. A connecting link extending across each drive arm is used to connect each drive arm to the coring head to decrease the coring head depth.

7 Claims, 20 Drawing Sheets

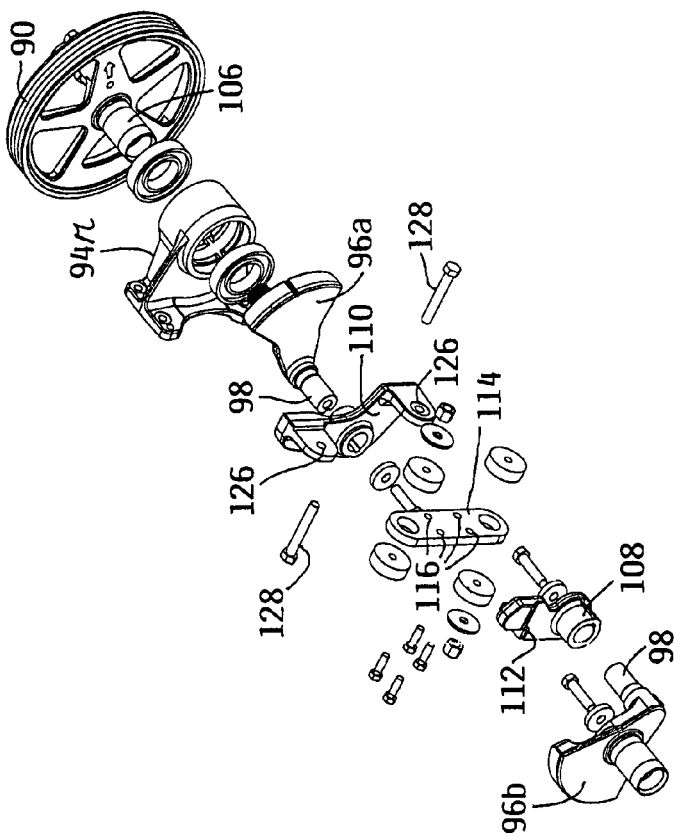
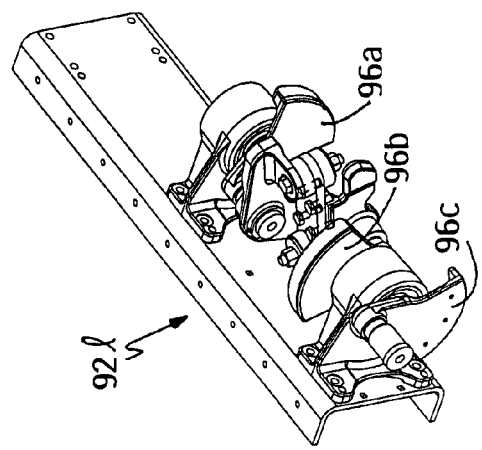
FIG. 20

AERATOR WITH SHORTENED CORING HEAD DEPTH

CROSS REFERENCE TO RELATED APPLICATIONS

This application is a division of application Ser. No. 11/474,651, filed Jun. 26, 2006, now U.S. Pat. No. 7,293,612 which is a division of application Ser. No. 10/706,607, filed Nov. 12, 2003, now U.S. Pat. No. 7,096,969, which claims the benefit of one or more previously filed copending provisional applications identified as follows: Application Ser. No. 60/425,375 filed Nov. 12, 2002.

TECHNICAL FIELD

This invention relates to an aerator for punching coring holes in the ground for aerating the turf or soil. More particularly, this invention relates to an aerator for use on relatively hilly and undulating terrain, such as that found on golf courses of the like, that is guided and operated by a walking operator.

BACKGROUND OF THE INVENTION

Walk aerators are well known for aerating an area of the ground by punching holes in the ground. Such aerators are guided by a walking operator who holds a handle assembly. Such aerators include a coring head that is carried on the aerator frame. The coring head includes a plurality of vertically reciprocal side-by-side tine assemblies, each tine assembly having multiple coring tines.

In prior art aerators, at least some of the ground engaging wheels supporting the aerator are mounted outboard, i.e. laterally outside of, the coring head. Thus, the wheels unduly increase the width of the aerator. In addition, when making multiple, back and forth passes over a ground area being aerated, the wheels will pass over at least some of the coring holes in the immediately preceding coring swath. When doing so, the wheels can compact previously formed holes or prematurely crush soil cores left from such holes. This is a disadvantage.

Another difficulty with prior art aerators presents itself when such aerators operate over uneven terrain. Because the coring head is generally fixed in place on the aerator frame, a varying ground contour will cause the depth of the coring holes to vary as well. Some coring holes will be too shallow and other coring holes too deep. It would be desirable for such an aerator to form holes having a substantially constant, uniform depth.

The crankshafts used in prior art aerators are typically expensive and must be precisely cast or machined. The bearings used in such crankshafts to journal the drive arms for the tine assemblies are not meant to be replaced and instead must be periodically lubricated. A less expensive and easily driven crankshaft in which the bearings are easily replaceable would be desirable.

Many prior art aerators have relatively heavy coring heads. Since the head is carried on one end of the aerator frame, a head having a large fore and aft or front to back depth as is true in prior art aerators serves to cantilever a lot of weight off one end of the frame. This may take too much weight off the other end of the frame, limiting steering and/or traction from the ground engaging wheels carried on the other end of the frame. A reasonably compact coring head would be advantageous.

SUMMARY OF THE INVENTION

An aspect of this invention relates to a walk aerator for punching a plurality of holes in the ground. The aerator comprises a frame supported for movement over the ground by a plurality of wheels. A coring head is carried on the frame. The coring head has a plurality of side-by-side tine assemblies that are vertically reciprocal for punching holes in the ground. The tine assemblies are vertically reciprocated by a plurality of drive arms with one drive arm reciprocating one tine assembly. A linkage connects each drive arm to the coring head. The linkage comprises a pivotal connecting link connected at a first end to the drive arm and at a second end to a first end of a biasing link, the biasing link having a second end resiliently and pivotally connected to the coring head. The first end of the connecting link connects to the drive arm on one side of the drive arm and the tine assembly. The connecting link then extends across the drive arm so that the second end of the connecting link connects to the biasing link on an opposite side of the drive arm and the tine assembly to decrease front to back depth of the coring head.

BRIEF DESCRIPTION OF THE DRAWINGS

This invention will be described more completely in the following Detailed Description, when taken in conjunction with the following drawings, in which like reference numerals refer to like elements throughout.

FIG. 20 is a partially exploded view, similar to FIG. 19, of the multi-part crankshaft of the coring head of the aerator of FIG. 1, but illustrating the crankshaft by looking at the crankshaft from the side of the crankshaft that is opposite to the side of the crankshaft illustrated in FIG. 19.

DETAILED DESCRIPTION

Figure 1:
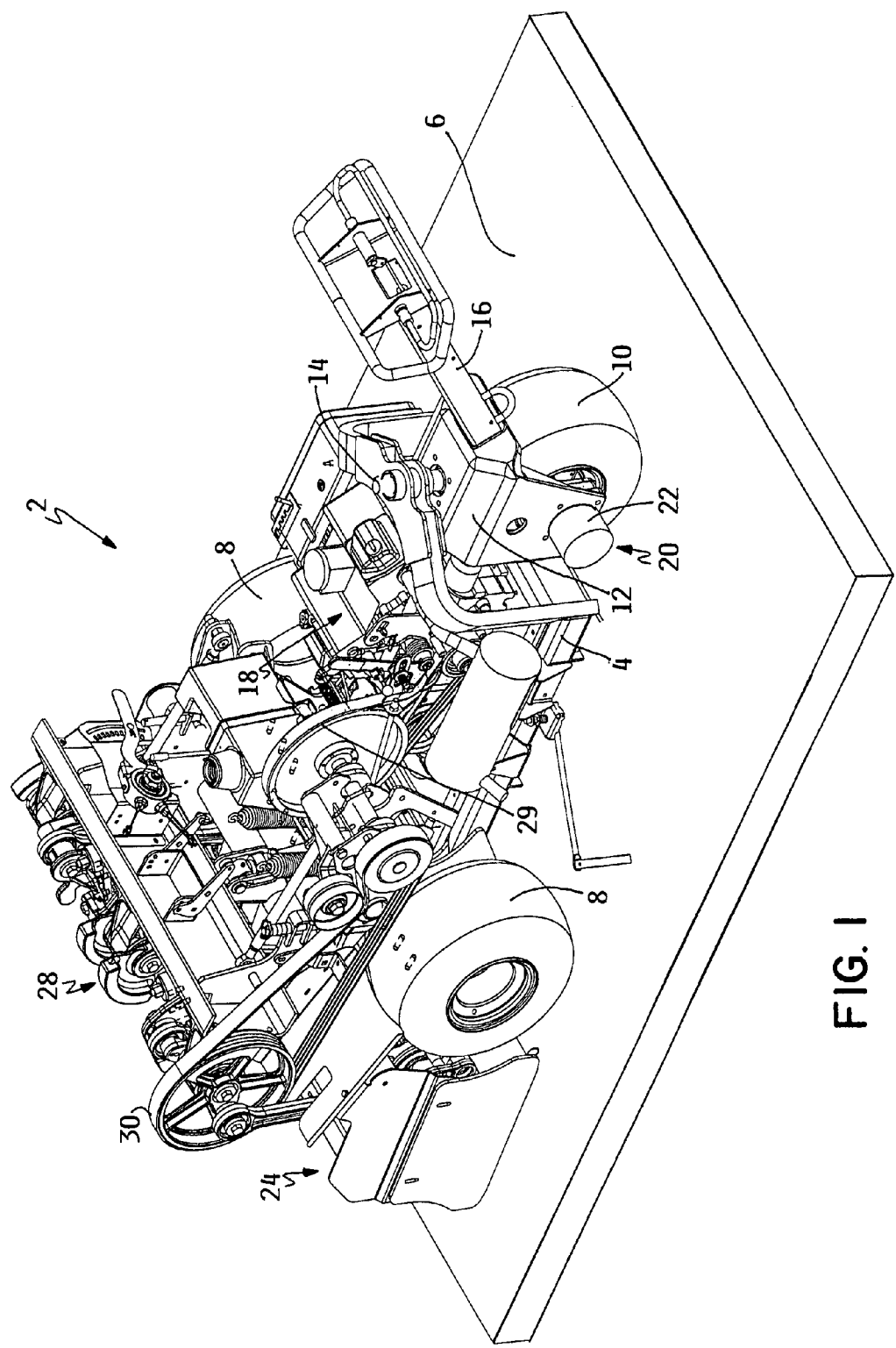
FIG. 1 is a perspective view of an aerator according to this invention, particularly illustrating the aerator from a spot ahead of the aerator looking to the rear of the aerator towards one side of the aerator.
Figure 2:
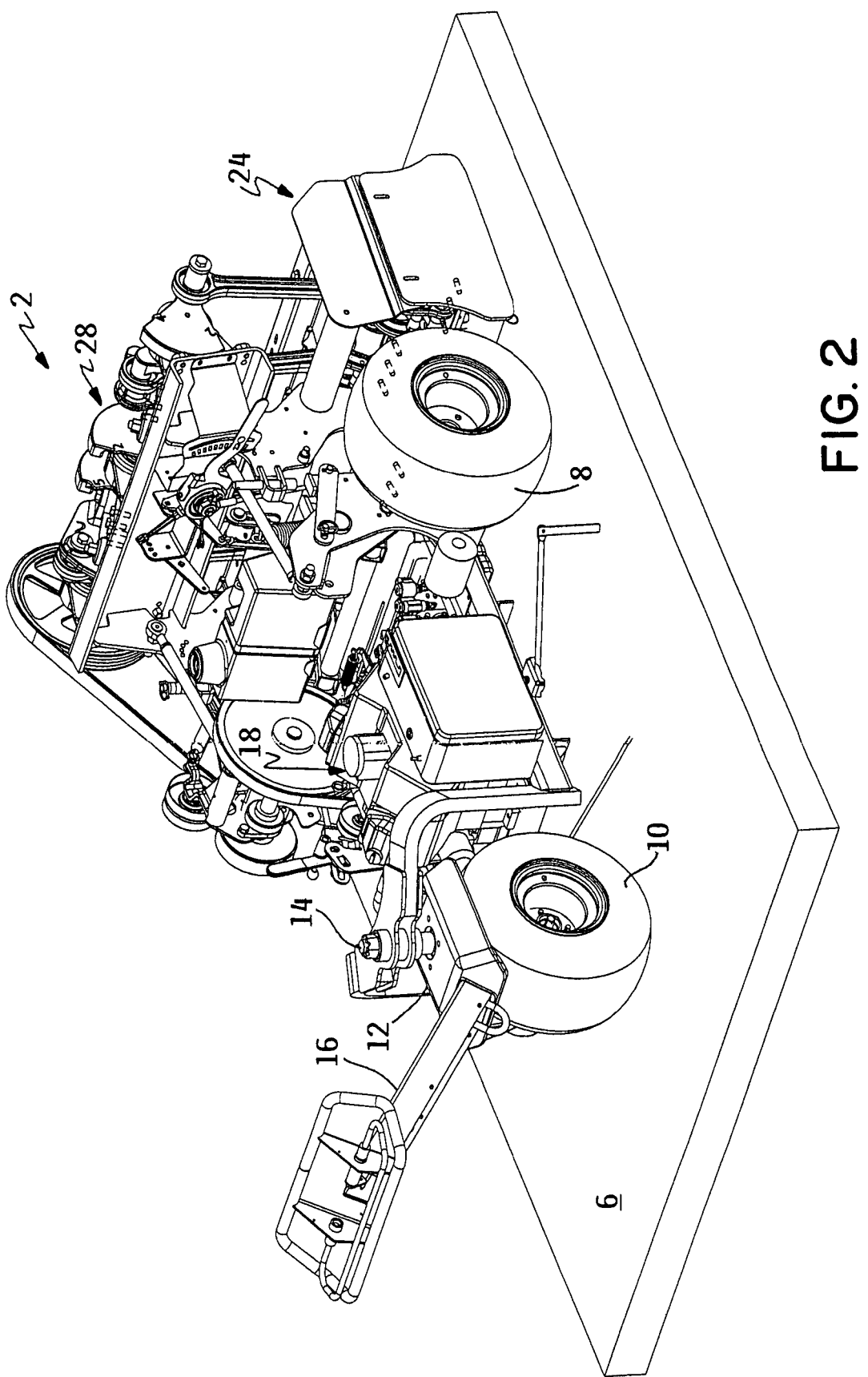
FIG. 2 is a perspective view of the aerator of FIG. 1, particularly illustrating the aerator from a spot ahead of the aerator looking to the rear of the aerator towards the side of the aerator that is opposite from the side illustrated in FIG. 1.
Figure 3:
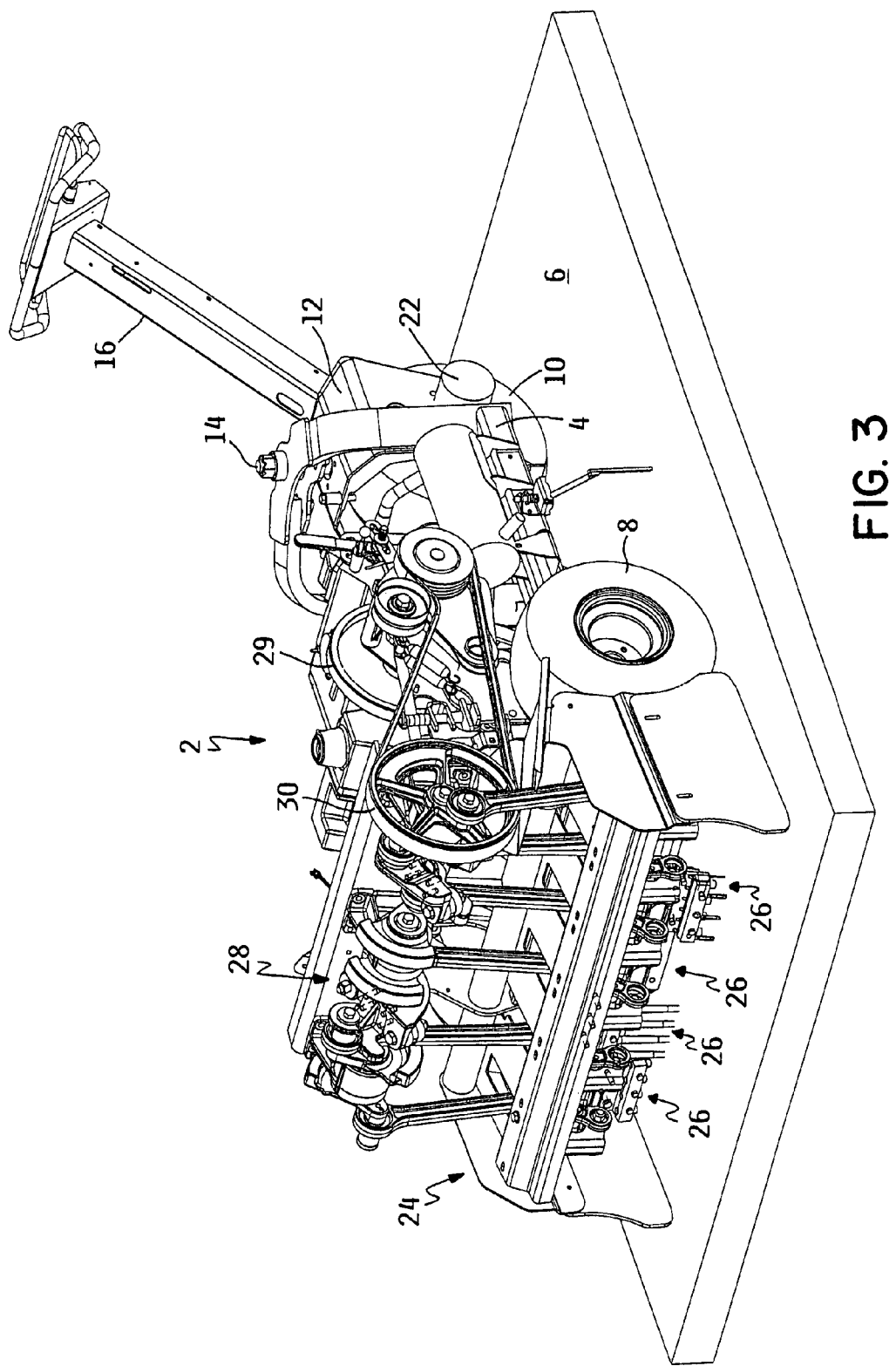
FIG. 3 is a perspective view of the aerator of FIG. 1, particularly illustrating the same side of the aerator as illustrated in FIG. 1 but from a spot behind the aerator looking to the front of the aerator.
Figure 4:
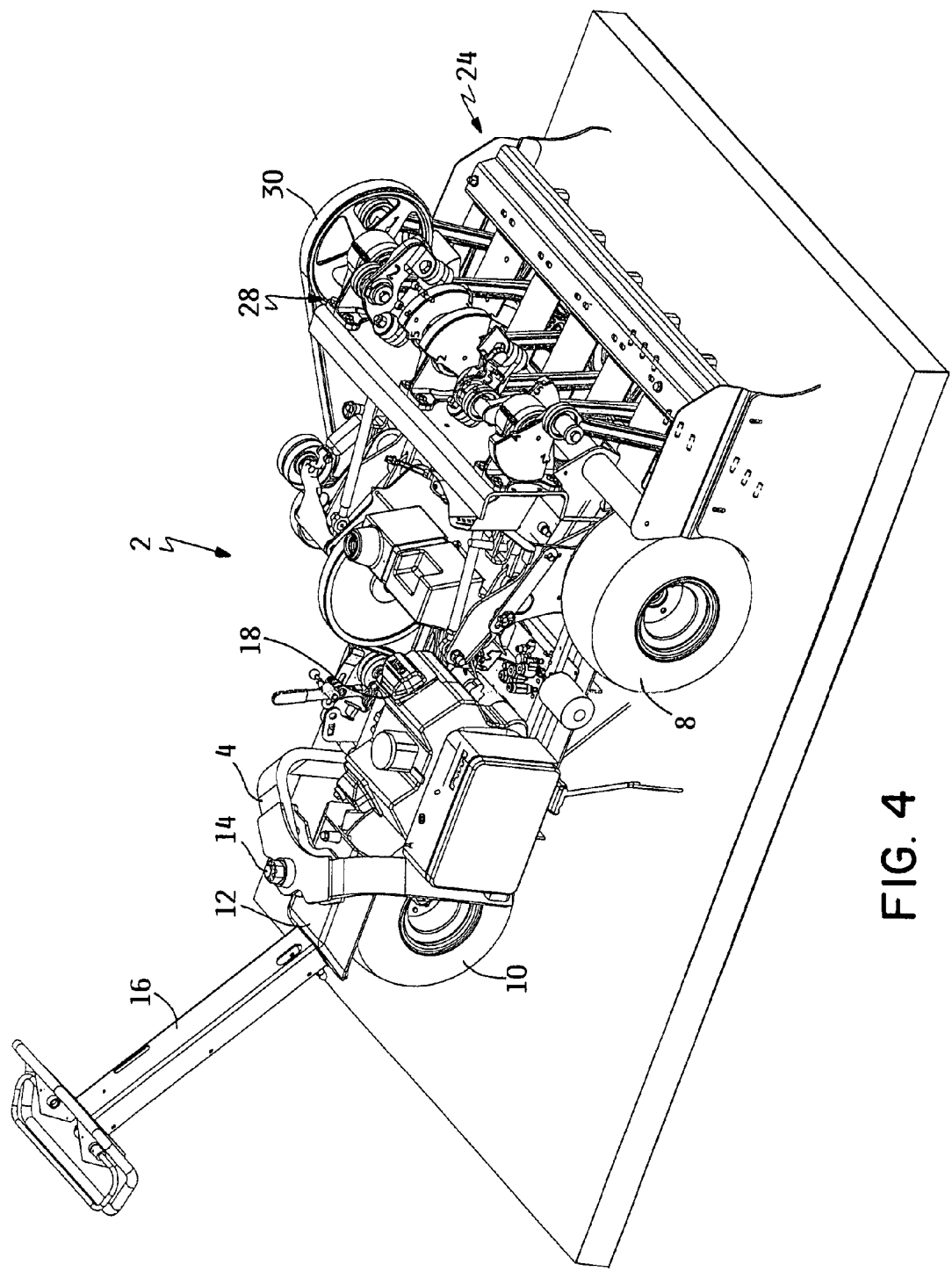
FIG. 4 is a perspective view of the aerator of FIG. 1, particularly illustrating the same side of the aerator as illustrated in FIG. 2 but from a spot behind the aerator looking to the front of the aerator.
Figure 5:
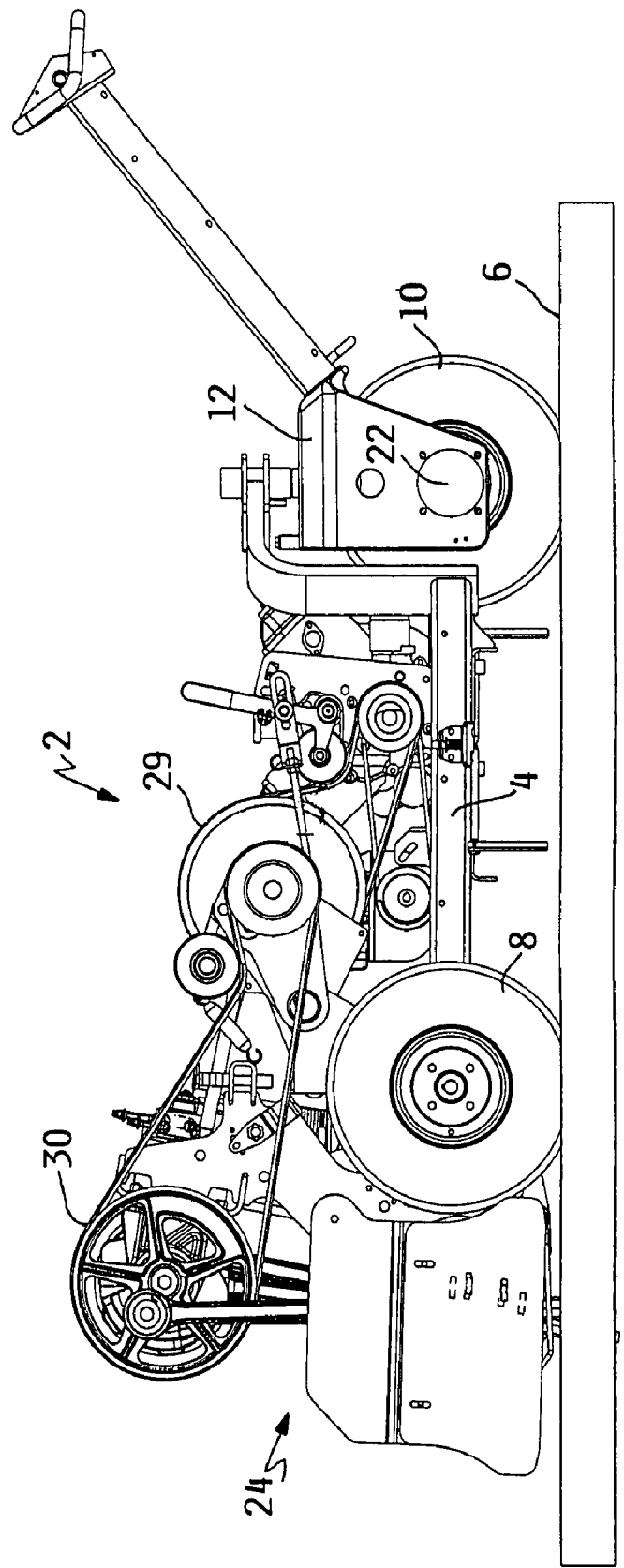
FIG. 5 is a side elevational view of the aerator of FIG. 1.

Referring first to FIGS. 1-6, the aerator of this invention is generally illustrated as 2. Aerator 2 comprises a frame 4 supported for movement over the ground 6 by a pair of rear wheels 8 and a front wheel 10 in a tricycle configuration. Front wheel 10 is carried in a pivotal yoke 12 that rotates about a substantially vertical pivot axis 14. An upwardly and forwardly extending handle assembly 16 is coupled to pivotal yoke 12 that carries front wheel 10. Thus, an operator who walks ahead of frame 4 can steer aerator 2 by using handle assembly 16 to steer or pivot front wheel 10 about substantially vertical pivot axis 14.

Frame 4 carries a prime mover 18 in the form of an internal combustion engine, though other prime movers such as an electric motor could also be used. Prime mover 18 provides power to a traction drive 20 for propelling frame 4 over ground 6 by driving one or more of wheels 8 or 10. Traction drive 20 could comprise a mechanical drive having mechanical transmissions coupled to wheel(s) 8 or 10. Preferably, however, traction drive 20 is a hydraulic drive in which prime mover 18 powers a hydraulic pump that supplies pressurized fluid to hydraulic motors 22 coupled to wheel(s) 8 or 10. All of wheels 8 or 10 could be driven or just some of wheels 8 or 10. The nature of traction drive 20 for propelling frame 4 over ground 6 is not important to this invention.

A coring head 24 is carried on the rear of frame 4 of aerator 2. Coring head 24 carries a plurality of side-by-side tine assemblies 26 that are reciprocated up and down by a crankshaft 28 driven by prime mover 18 through a plurality of belt drives 29, 30 providing speed reduction. Each tine assembly 26 has a plurality of hollow coring tines 32 that can be driven into ground 6 to punch holes in ground 6 for the purpose of aerating the turf to promote turf growth. Coring tines 32 will also extract soil cores and deposit such cores on ground 6 behind aerator 2 with such soil cores being ejected from the upper ends of coring tines 32. However, hollow coring tines 32 could be replaced with solid tines in which case no soil cores are ejected. Additionally, hollow coring tines 32 could be replaced with hollow tines having a side slot for ejecting the soil cores through one side of the tines rather than from the top of the tines.

Figure 15:
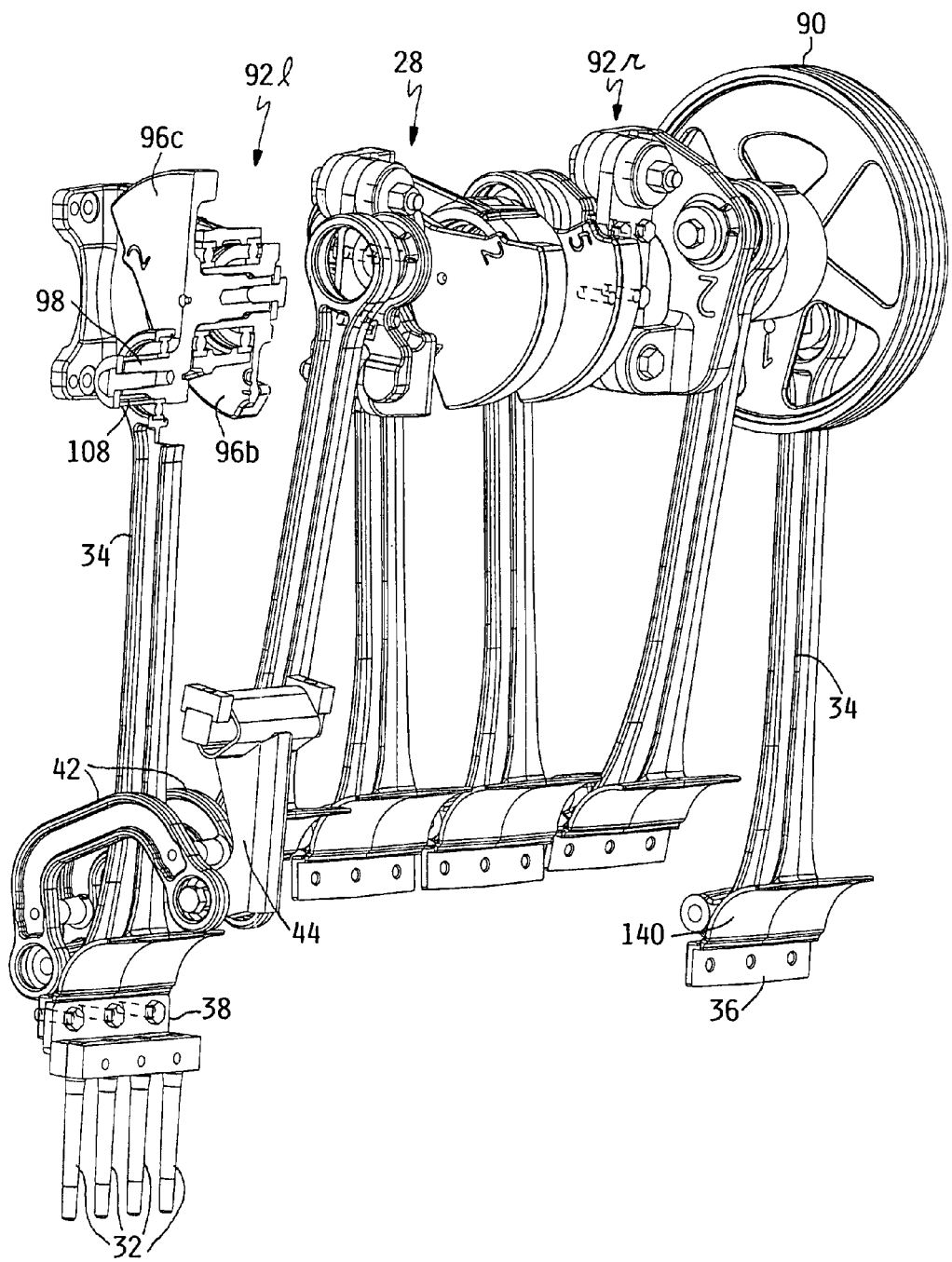
FIG. 15 is a perspective view of portions of the coring head of the aerator of FIG. 1, particularly illustrating the tine assemblies, drive arms and crankshaft for driving the drive arms and connected tine assemblies, with the tine assembly and drive arm on the far left of FIG. 15 being exploded and illustrating the connecting link and biasing link for such tine assembly and drive arm with the connecting links and biasing links for the other tine assemblies and drive arms being omitted from FIG. 15 for the purpose of clarity.

There are six side-by-side tine assemblies 26 that are driven upwardly and downwardly by six drive arms 34. The upper end of each drive arm 34 is pivotally connected to crankshaft 28. The lower end of each drive arm 34 has a flange 36 to which a tine holder 38 for holding a plurality of coring tines 32 may be releasably bolted. See FIG. 15. When tine holder 38 is bolted to the lower end of drive arm 34, tines 32 carried in tine holder 38 are fixed to and move up and down with drive arm 34 as drive arm 34 is driven up and down by crankshaft 28.

Figure 16:
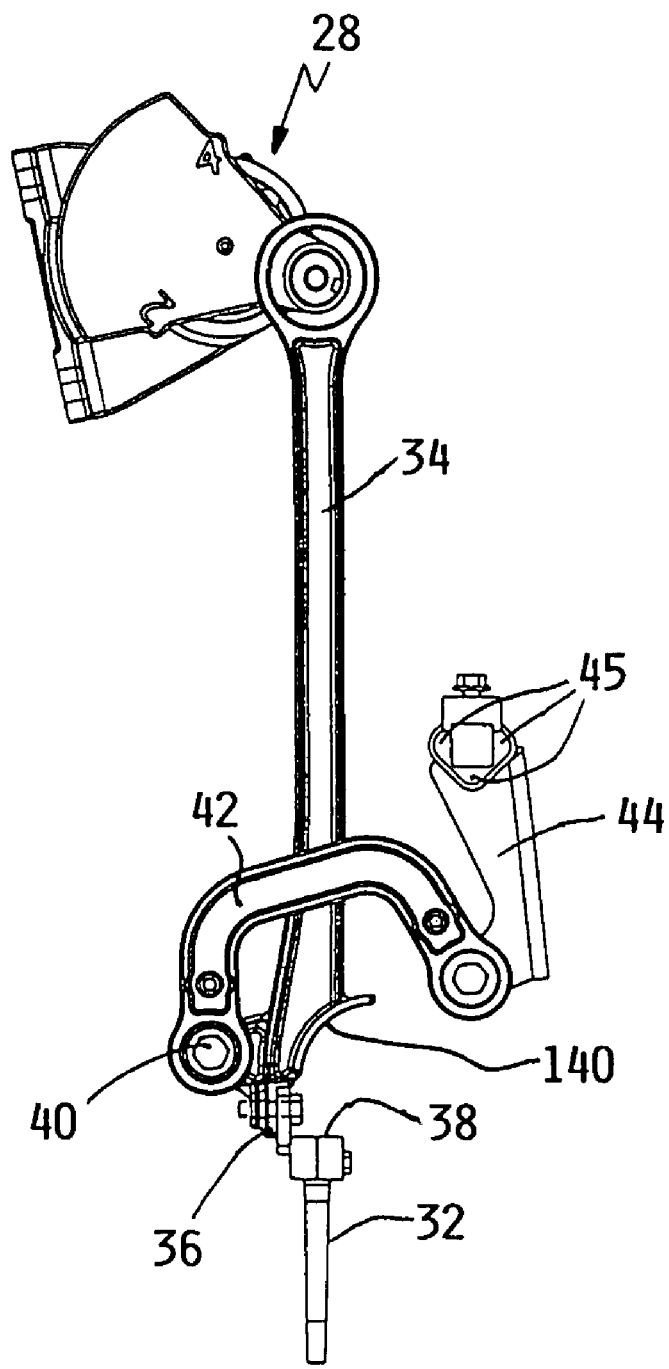
FIG. 16 is a side elevational view of one drive arm and its connection to the crankshaft, of one tine assembly carried on the lower end of the drive arm, of one connecting link for connecting the drive arm to the frame of the coring head through one biasing link between the connecting link and the frame of the coring head, and also particularly illustrating the integral core deflector formed on the lower end of the drive arm above the tine assembly.
Figure 17:
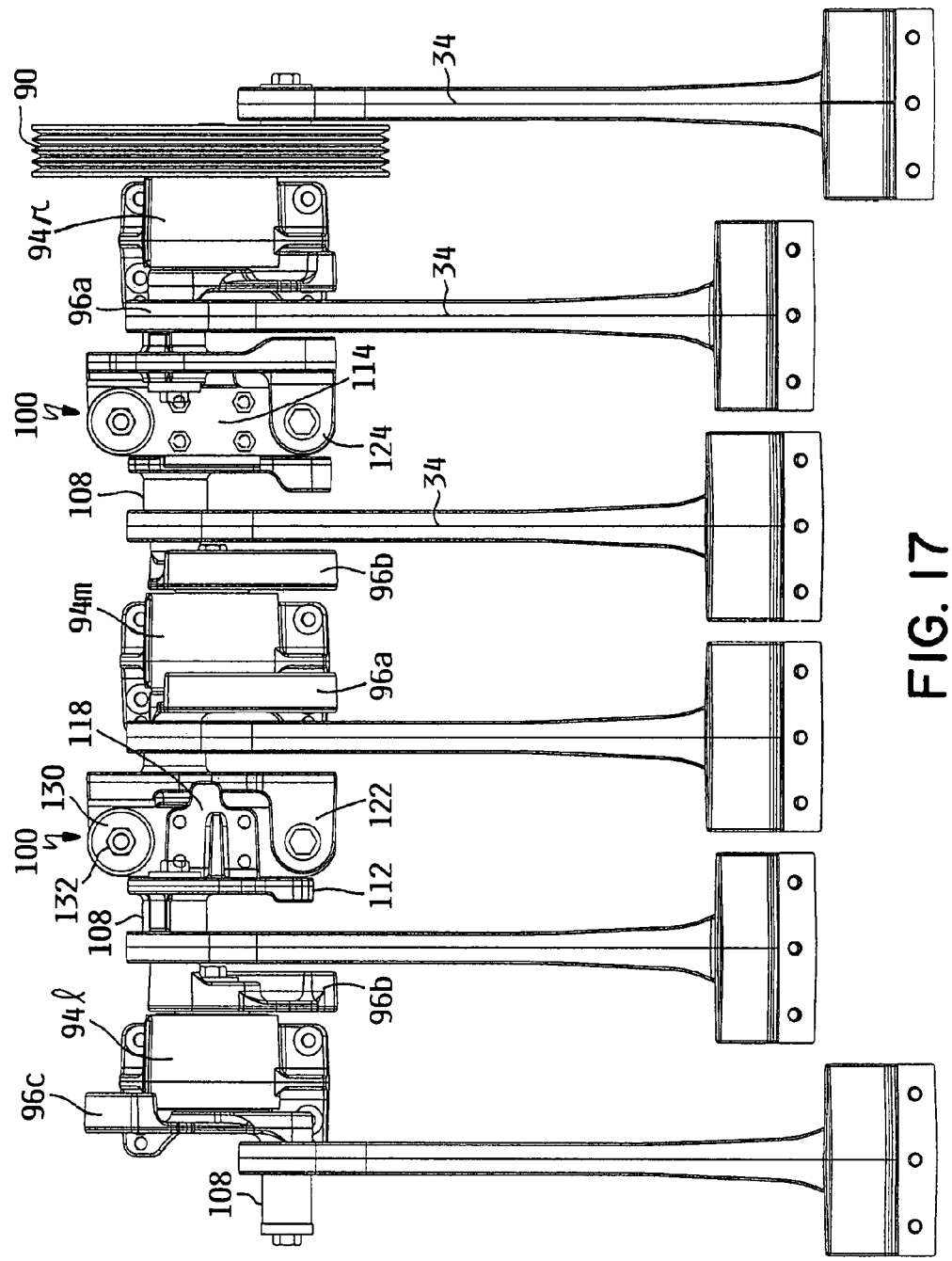
FIG. 17 is a rear elevational view of the crankshaft, drive arms, and tine assemblies (without tines) of the coring head of the aerator of FIG. 1, particularly illustrating the multi-part crankshaft in an assembled condition.
Figure 18:
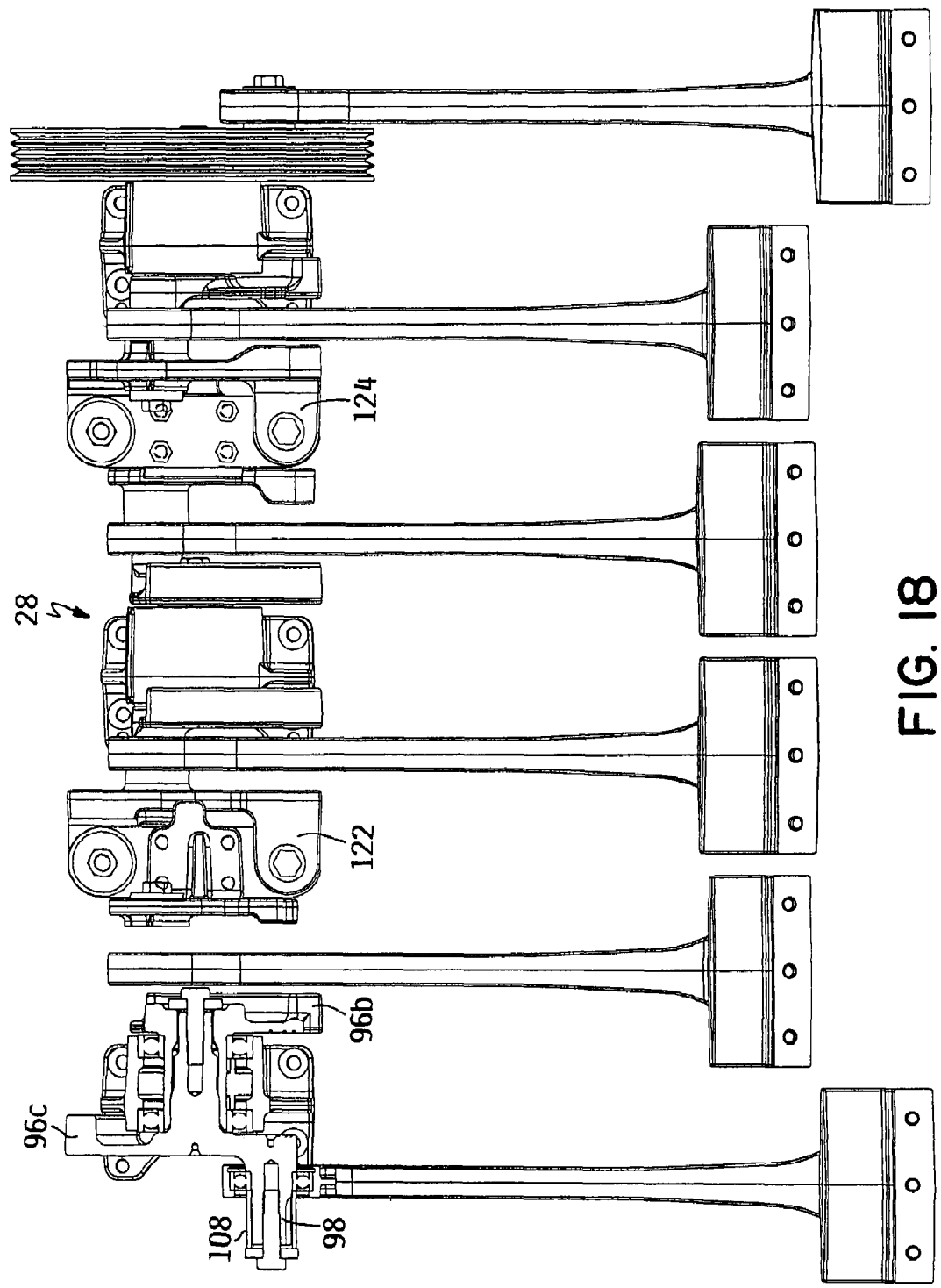
FIG. 18 is a rear elevational view of the crankshaft, drive arms, and tine assemblies (without tines) of the coring head of the aerator of FIG. 1, particularly illustrating a portion of the multi-part crankshaft in an exploded, cross-sectional condition.

The lower end of each drive arm 34 is pivotally connected by a pivot pin 40 to at least one connecting link 42. See FIG. 16. Actually, a pair of connecting links 42 are used, one on each side of drive arm 34, but only a single such connecting link 42 could be used. Thus, any reference to connecting link 42 herein in the singular is not meant to limit use to a single such connecting link, but to at least one such connecting link. The other end of each connecting link 42 is pivotally connected to a biasing link 44 that is resiliently connected at its upper end to coring head 24 by a plurality of resilient biasing members 45 as disclosed in the assignee's published U.S. patent application Ser. No. 09/867,268 (Publication No. US-2002-0043376-A1), that is hereby incorporated by reference. See FIG. 16.

Aerator 2 as illustrated herein is shown without certain shrouds or guards that would normally be present, such shrouds or guards being omitted from the drawings for clarity. For example, crankshaft 28 and the upper ends of drive arms 34 would normally be enclosed inside a removable shroud.

Belt drives 29 and 30 might also be shrouded, either individually or as part of a large shroud over much of frame 4.

The Inboard Wheels

Figure 6:
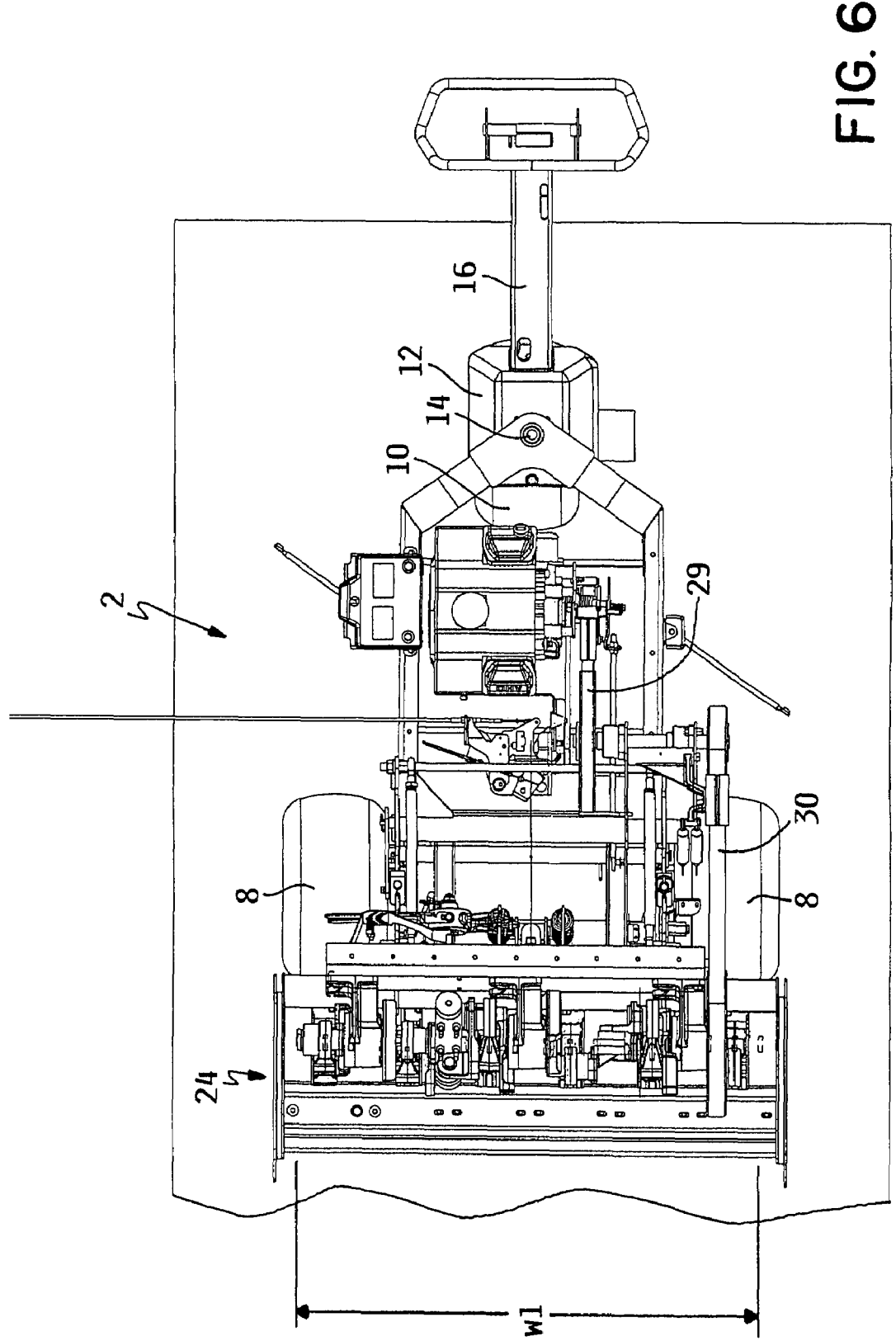
FIG. 6 is a top plan view of the aerator of FIG. 1.
Figure 7:
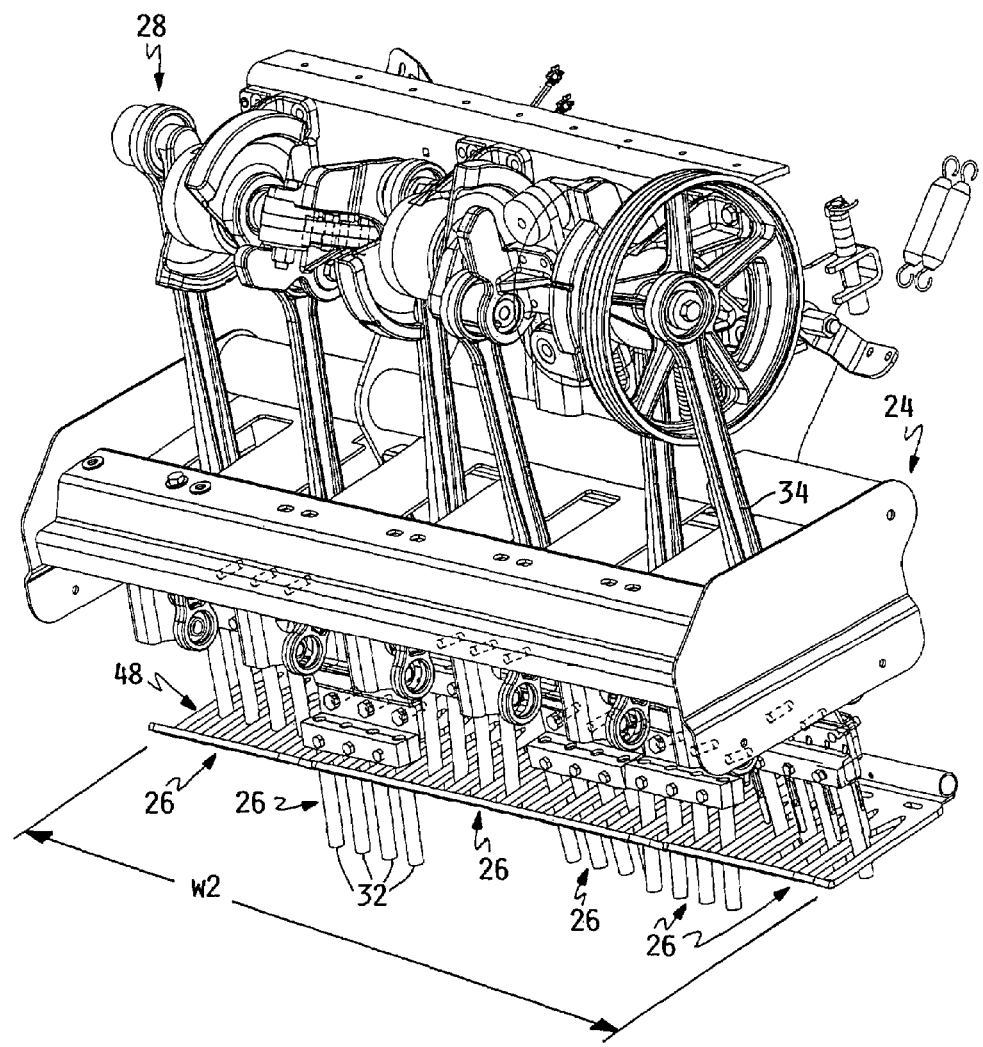
FIG. 7 is a perspective view of a portion of the aerator of FIG. 1, particularly illustrating the coring head and crankshaft from a spot behind the coring head looking to the front of the aerator towards one side of the coring head.
Figure 8:
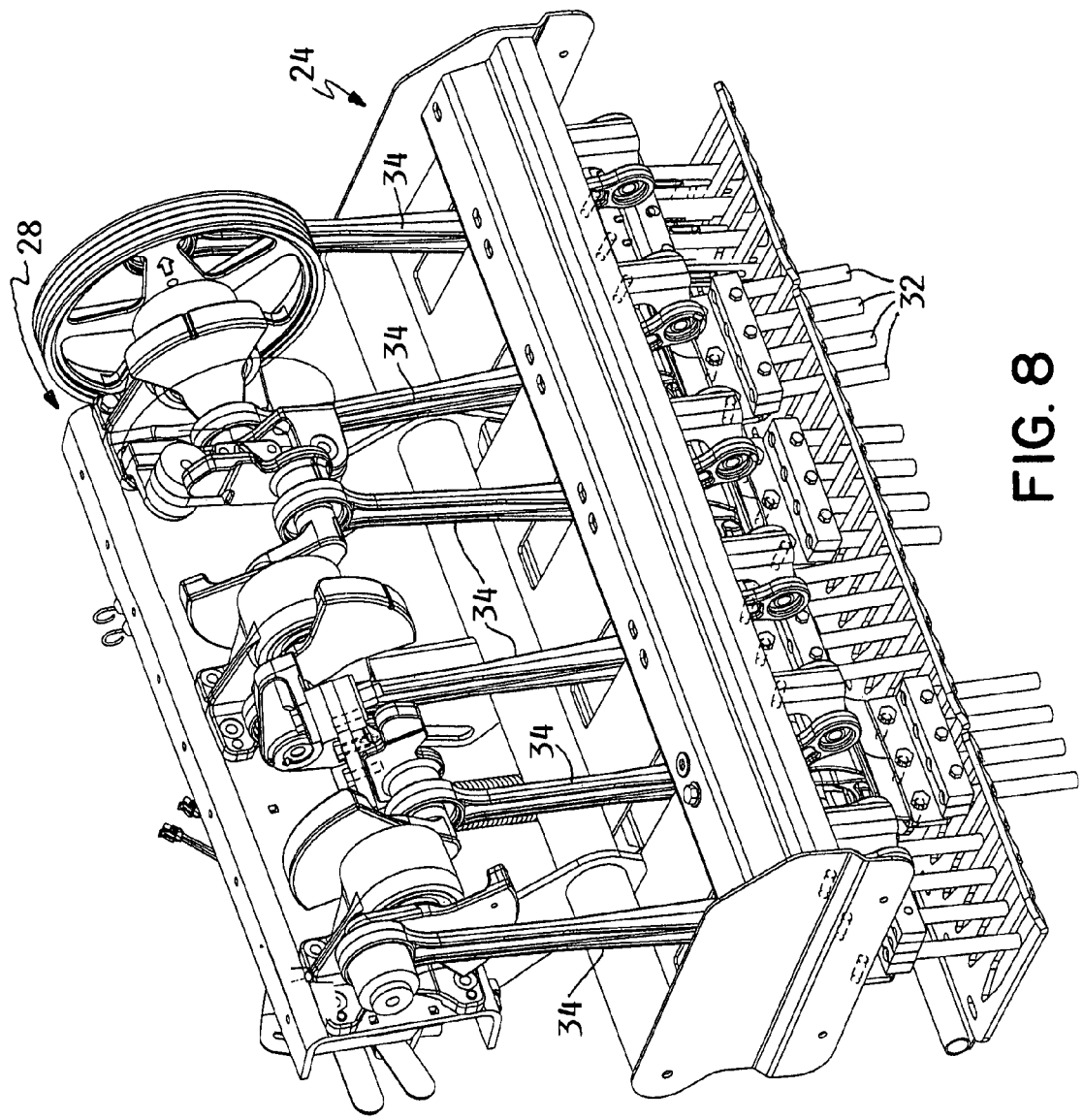
FIG. 8 is a perspective view of a portion of the aerator of FIG. 1, particularly illustrating the coring head and crankshaft from a spot behind the coring head looking to the front of the aerator towards the side of the coring head opposite from the side illustrated in FIG. 7.
Figure 9:
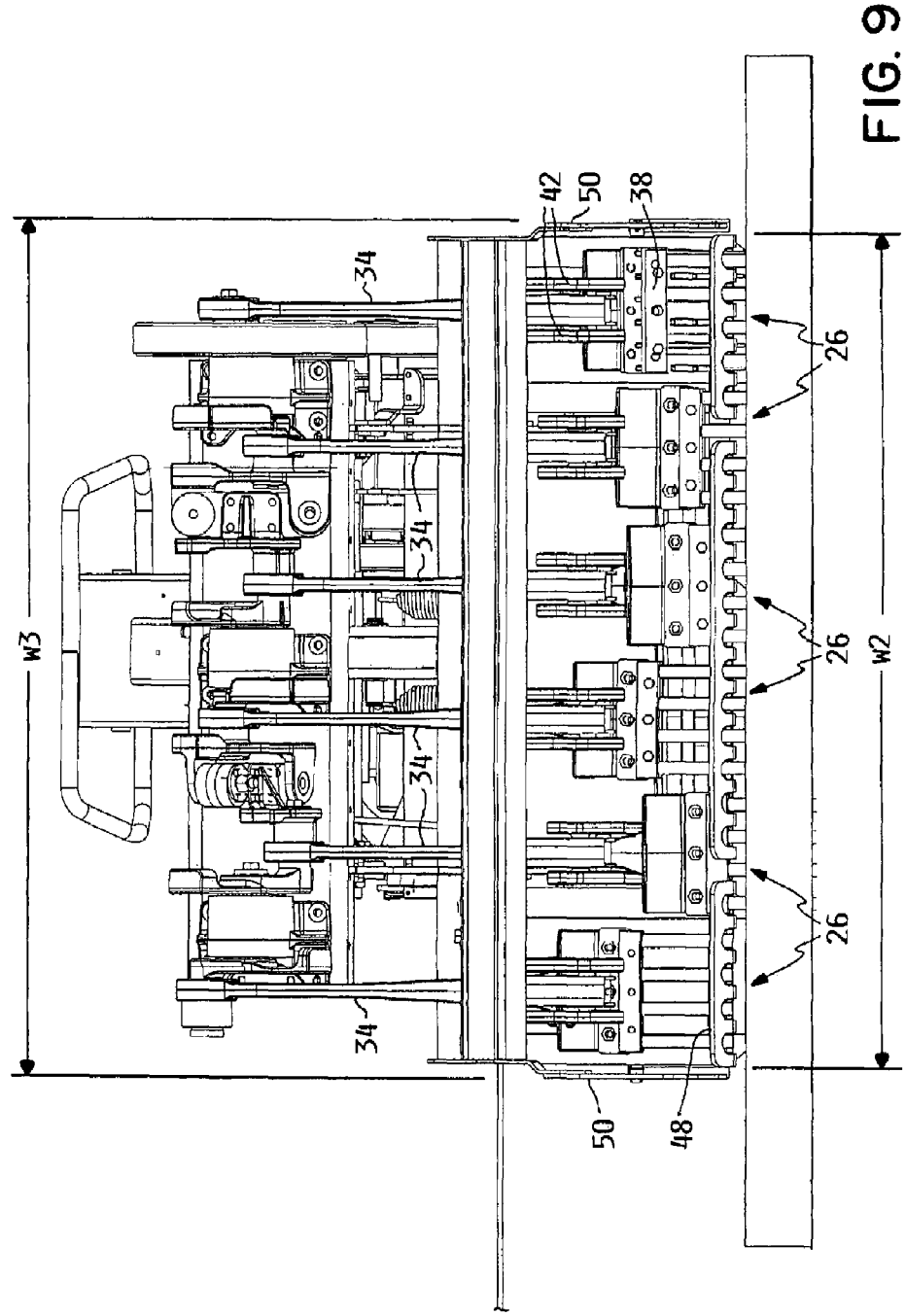
FIG. 9 is a rear elevational view of the coring head of the aerator of FIG. 1, particularly illustrating the coring head from a spot behind the coring head looking to the front of the aerator.

In aerator 2 of this invention, spaced rear wheels 8 are placed in front of coring head 24 substantially adjacent and ahead of each side of coring head 24. The lateral wheelbase provided by spaced rear wheels 8, illustrated as w1 in FIG. 6, is measured by the width between the laterally outermost edges of the ground engaging tread of rear wheels 8. The width of a coring swath, illustrated as w2 in FIGS. 7 and 9, is measured by the width of the slotted, ground engaging skid assembly 48 through which coring tines 32 pass during operation of coring head 24, or the width between the laterally outermost edges of the outermost coring tines 32, whichever is larger. The width w2 of the coring swath is also approximately equal to, but slightly less, than the maximum width between side plates 50 of coring head 24, illustrated as w3 in FIG. 9.

The placement of rear wheels 8 in front of and ahead of each side of coring head 24 allows the wheelbase w1 of aerator 2 to be approximately the same as the width of a coring swath w2. Typically, aerator 2 will travel back and forth over an area of turf to be aerated in multiple, side-by-side passes to form multiple, side-by-side coring swathes that collectively cover the entire area. With aerator 2 of this invention, rear wheels 8 in a subsequent pass do not travel over the coring holes or the soil cores that were formed in the immediately adjacent and preceding coring swath. This avoids crushing any of the soil cores prior to a subsequent top dressing operation and avoids compacting or filling back in any of the coring holes just formed in the preceding coring swath. This is an advantage over prior art aerators.

In addition, aerators of this type will often have to pass through fairly narrow openings or passages, e.g. through a gate or between trees or the like. By placing rear wheels 8 inboard of side plates 50 of coring head 24, the width w3 of coring head 24 for a given wheelbase w1 is maximized. Thus, the wheelbase w1 can be kept fairly small to emphasize maneuverability of aerator 2, but the width w2 of a swath of coring head 24 will still be approximately equal to wheelbase w1 to enhance productivity of aerator 2.

The Ground Following Coring Head

Aerators of this type often operate over hilly or inclined ground as well as level ground. Aerator 2 of this invention is designed to adjust the vertical position of coring head 24 in response to changes in ground contour to keep the depth of the coring holes approximately constant at a preset or predetermined nominal depth for the holes. Without such ground following ability, the depth of the coring holes would otherwise change fairly significantly, becoming deeper and shallower from the nominal depth when coring head 24 travels up or down a hill or incline as opposed to traveling on level ground. However, with the ground following ability provided in aerator 2 of this invention, coring head 24 is vertically raised or lowered relative to frame 4 as the ground contour rises or falls to keep the depth of the coring holes fairly constant at the nominal value for the depth.

Figure 10:
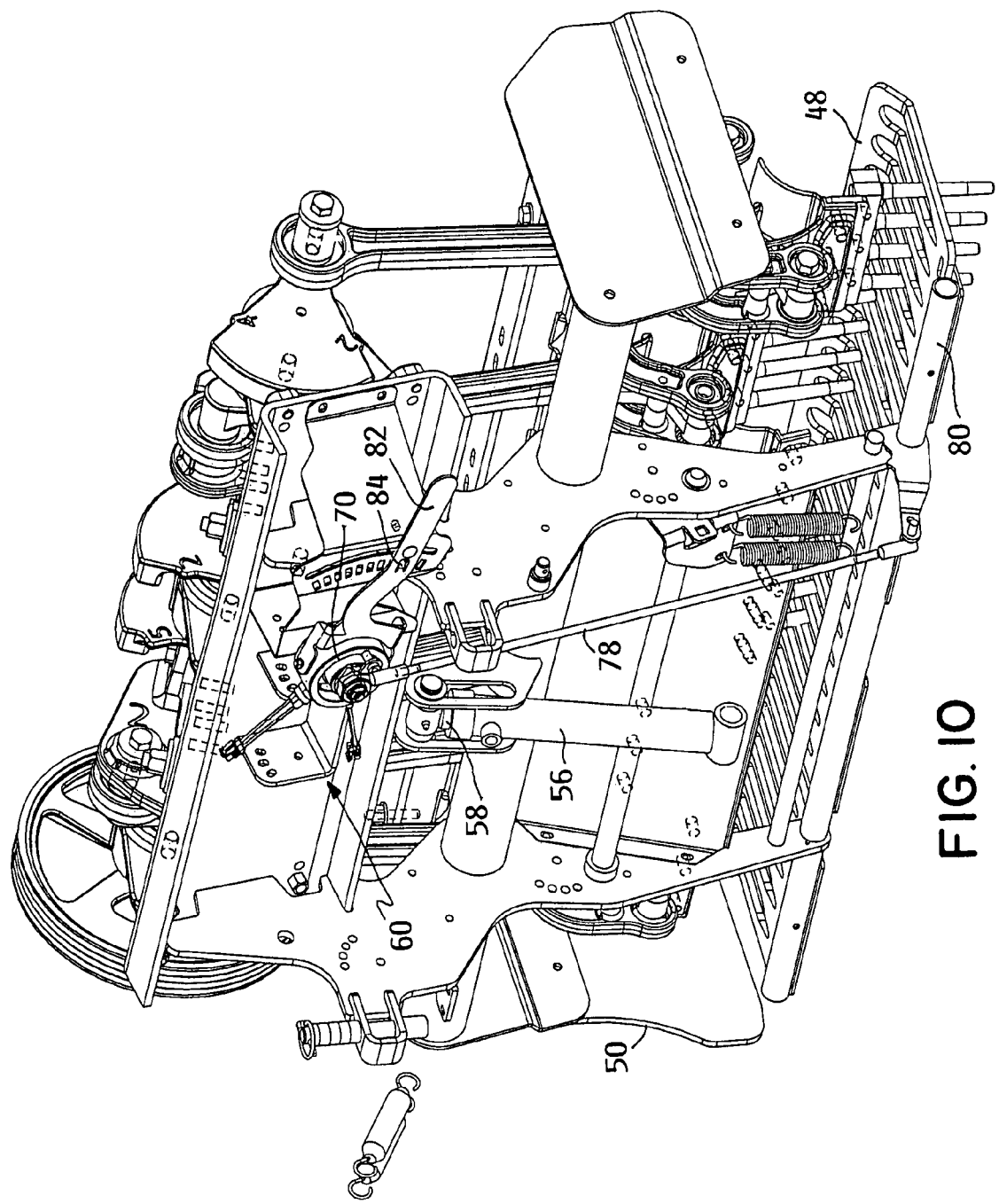
FIG. 10 is a perspective view of the coring head of the aerator of FIG. 1, particularly illustrating the coring head from a spot ahead of the coring head looking to the rear of the aerator and showing the ground following control system that adjusts the coring head height relative to the ground in response to changes in ground contour.
Figure 11:
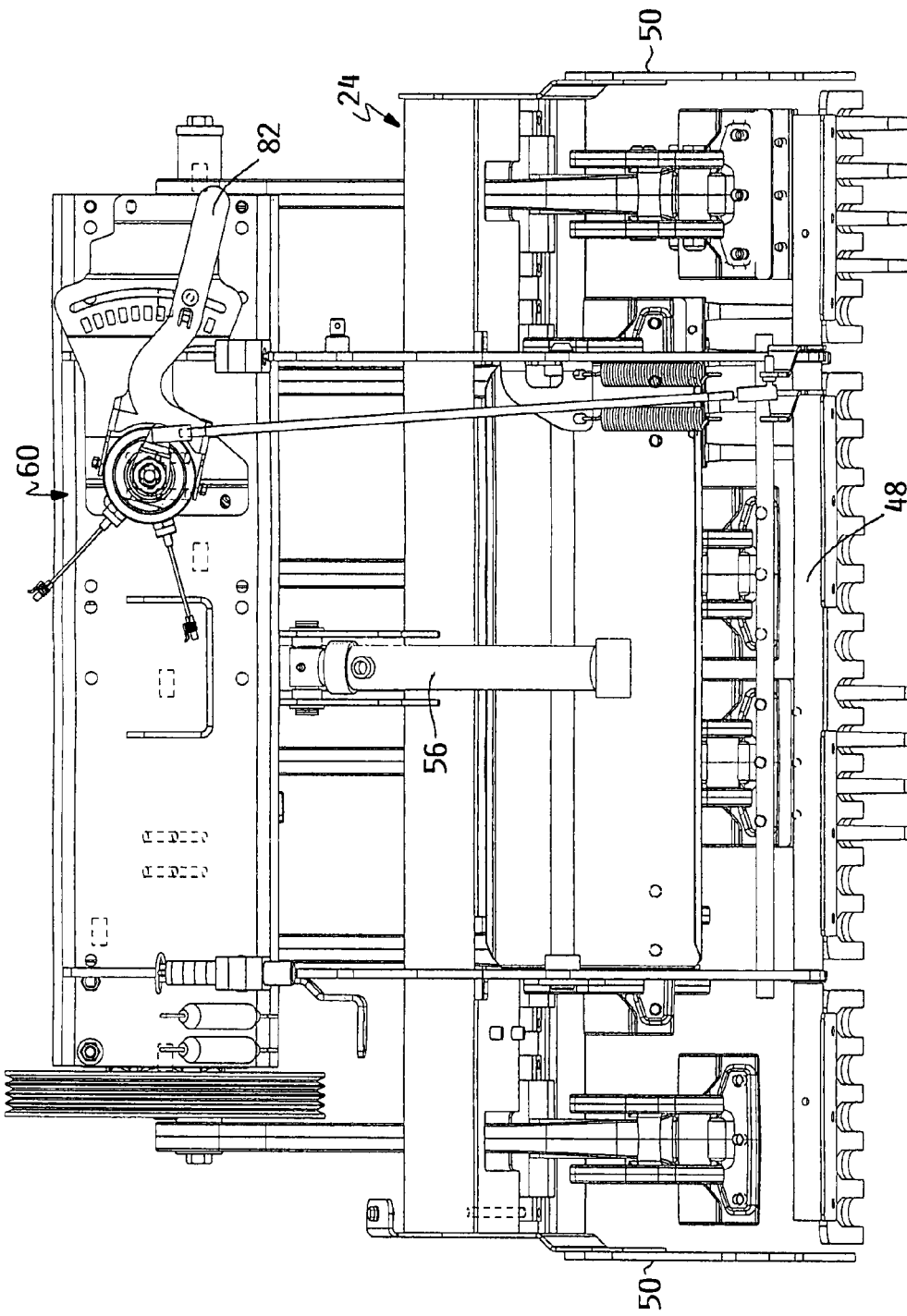
FIG. 11 is a front elevational view of the coring head of the aerator of FIG. 1, particularly illustrating the coring head from a spot ahead of the coring head looking to the rear of the aerator and showing the ground following control system that adjusts the coring head height relative to the ground in response to changes in ground contour.
Figure 14:
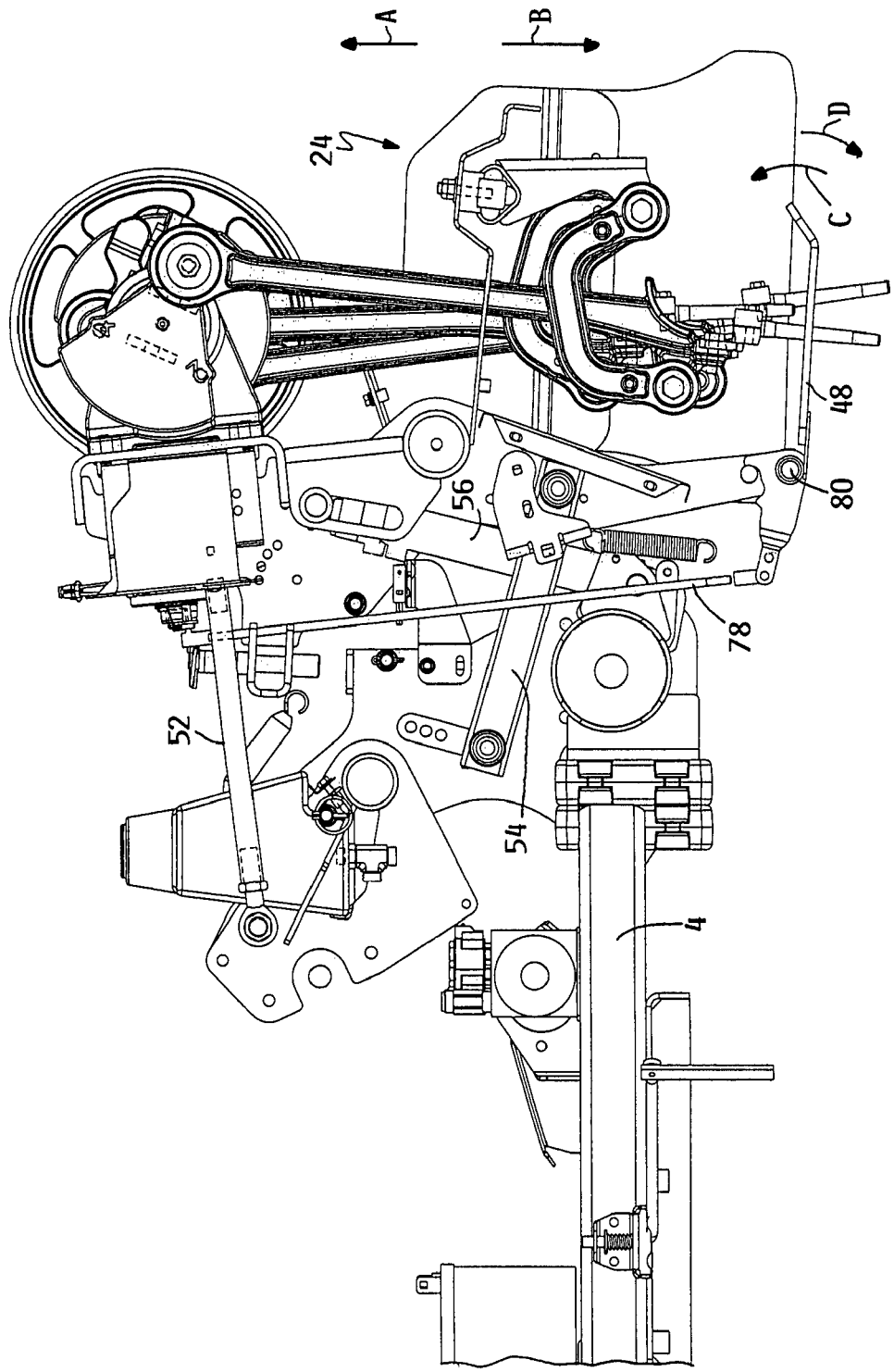
FIG. 14 is a side elevational view of the coring head of the aerator of FIG. 1 with one of the side plates of the coring head removed to better illustrate the tine assemblies and drive arms.

Referring to FIG. 14, coring head 24 is vertically adjustable up and down on frame 4 of aerator 2 as indicated by the arrows A and B. This is due to the fact that coring head 24 is movably attached to frame 4 of aerator 2 by a four bar linkage, two bars 52 and 54 of which are shown in FIG. 14. Another pair of bars, identical to the bars 52 and 54 shown in FIG. 14, connect the other side of coring head 24 to the other side of frame 4 of aerator 2. In addition, a powered actuator in the form of a hydraulic cylinder 56 is pivotally connected between frame 4 of aerator 2 and coring head 24. Coring head 24 will raise or lower relative to frame 4 of aerator 2 when a cylinder rod 58 of hydraulic cylinder 56 is either extended out of or retracted into hydraulic cylinder 56. Hydraulic cylinder 56 is shown in FIGS. 10 and 11. Other suitable actuators, such as an electric linear actuator, could be used in place of hydraulic cylinder 56.

Referring now to FIGS. 10-14, a ground following control system 60 detects changes in the ground contour and operates hydraulic cylinder 56 as needed to adjust the height of coring head 24. As shown most clearly in FIGS. 12 and 13, control system 60 includes first and second limit switches 62 and 64 contained in a circular switch housing 66. Each limit switch 62 or 64 comprises a ball or button 68 that is radially biased inwardly into switch housing 66. When ball or button 68 extends radially inwardly into switch housing 66, the corresponding limit switch 62 or 64 is not actuated. Limit switch 62 or 64 is actuated by pressing its ball or button 68 radially outwardly in switch housing 66.

A rotatable switch actuator 70 is contained inside switch housing 66. Switch actuator 70 includes a flat portion 72 and a circular portion 74 having a diameter that is large enough to actuate switches 62 or 64.

Switch actuator 70 is coupled by a pivotal connecting rod 78 to ground following skid assembly 48. Skid assembly 48 slides along on top of ground 6 during operation of aerator 2. As the contour of ground 6 changes, skid assembly 48 rotates relative to coring head 24 about a rotational axis 80. If skid assembly 48 encounters a hill or incline in ground 6 and coring head 24 begins to climb such hill or incline, skid assembly 48 will be forced up towards coring head 24 to pivot in the direction of the arrow C as shown in FIG. 14. If skid assembly 48 encounters a hill or incline and coring head begins to travel down such hill or incline, skid assembly 48 will drop away from coring head 24 to pivot in the opposite direction as indicated by the arrow D in FIG. 14.

As skid assembly 48 rotates about its rotational axis 80, pivotal connecting rod 78 will rise or fall accordingly, and will cause switch actuator 70 to rotate inside switch housing 66 in one direction or the other. For example, if skid assembly 48 rotates in the direction of the arrow C, indicating that a hill or incline has been encountered and coring head is beginning to move up the hill, the rotation of skid assembly 48 will pull pivotal connecting rod 78 downwardly as indicated by the arrow E in FIG. 13, thus rotating switch actuator 70 in a clockwise direction as indicated by the arrow F in FIG. 13. If the hill or incline is large and long enough, switch actuator 70 will rotate far enough in the direction of the arrow F in FIG. 13 so that ball or button 68 of second limit switch 64 will hit the circular portion 74 of switch actuator 70 to become depressed by circular portion 74. When second limit switch 64 is depressed or actuated in this manner, hydraulic cylinder 56 will be actuated to extend cylinder rod 58 to thereby raise coring head 24 on frame 4, thus causing skid assembly 48 to begin to pivot back around axis 80 to a normal position in which it is relatively horizontal. As skid assembly 48 pivots back to this normal position, switch actuator 70 will pivot back in the opposite direction as indicated by the arrow G in FIG. 13 to release second limit switch 64 and end the height adjustment operation of coring head 24. Thus, when coring head 24 first heads up a hill or incline, this is sensed by the pivoting of skid assembly 48 out of its normal horizontal position and the height of coring head 24 is raised until skid assembly 48 pivots back down into its normal horizontal position.

The effect of all of the above is to keep the depth of the coring holes relatively constant at the preset nominal value for the coring holes. Without adjustment of coring head 24, the coring holes would increase in depth as coring head 24 goes up a hill or incline. However, by raising coring head 24 as it goes up a hill or incline, the depth of the coring holes will remain relatively constant with respect to the nominal hole depth.

Figure 13:
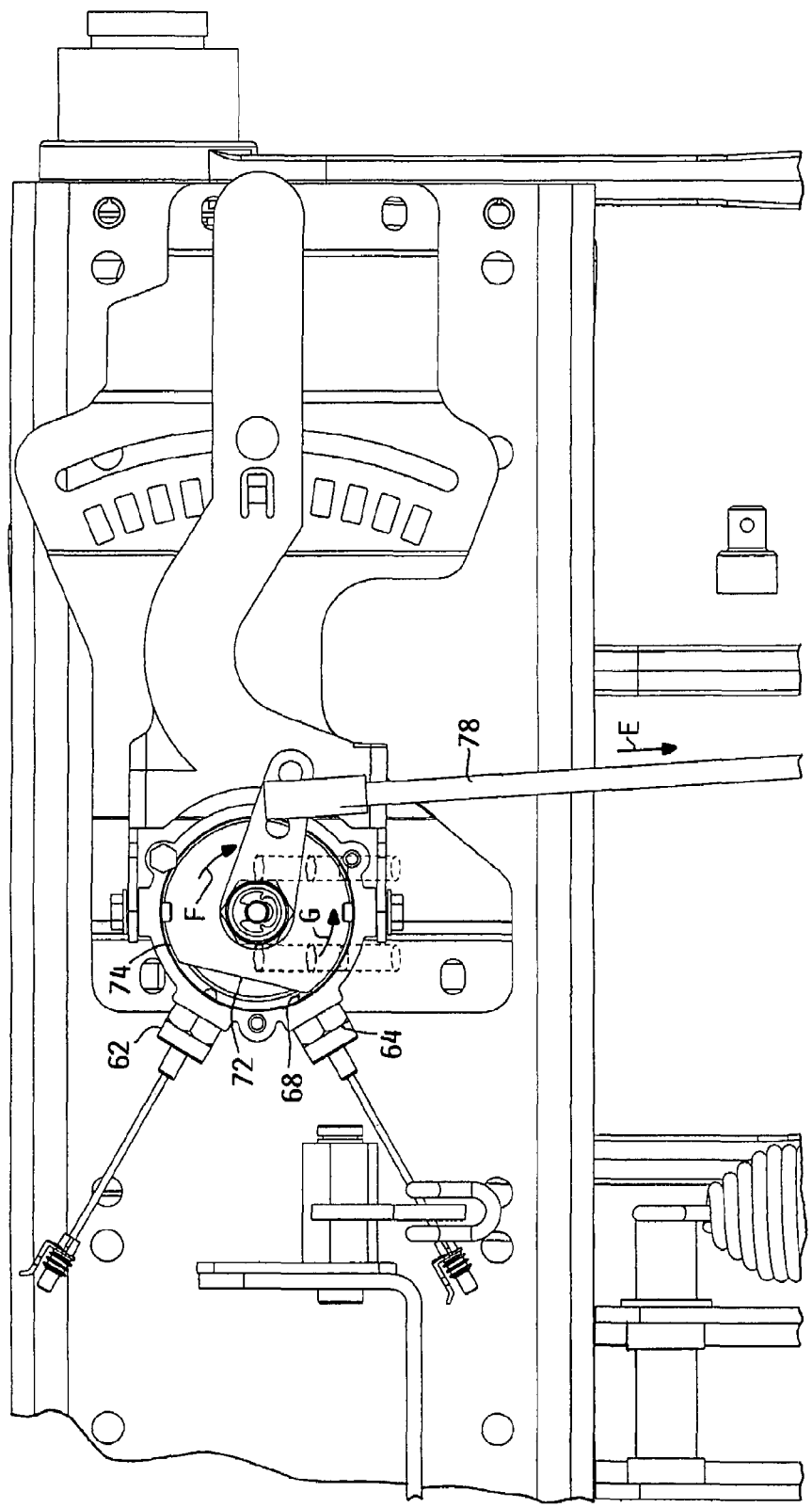
FIG. 13 is a front elevational view, similar to FIG. 12, of a portion of the ground following control system shown in FIGS. 10 and 11, particularly illustrating the ground following control system in a position corresponding to passage of the aerator over uneven ground such that the height of the coring head is about to be adjusted by the control system to take such uneven ground into account.

When coring head 24 reaches the top of the hill or incline, and begins traveling over a relatively level surface again, this is again sensed by skid assembly 48, which will now rotate about its rotational axis 80 in the opposite direction, namely in the direction of the arrow D in FIG. 14. As this occurs, pivotal connecting rod 78 is raised to rotate switch actuator 70 in a counter-clockwise direction G as indicated in FIG. 13. When switch actuator 70 rotates far enough, circular portion 74 will actuate first limit switch 62. When first limit switch 62 is actuated, hydraulic cylinder 56 will be operated to begin retracting cylinder rod 58, to thereby lower the height of coring head 24 on frame 4. Such lowering is necessary to return the height of coring head 24 to its normal, predetermined position on frame 4 so that the depth of the coring holes remains relatively constant as coring head 24 now passes over relatively flat and level ground.

The first and second limit switches are spaced apart far enough so that switch actuator 70 must rotate approximately 5° before either of the first and second limit switches are actuated. This means that there is a zone of ground contour variation that will not actuate the height adjustment of coring head 24. If ground 6 is only slightly undulating but is more or less generally flat and level, no height adjustment will occur. Height adjustment of coring head 24 will occur only in response to more significant variations in ground contour.

Figure 12:
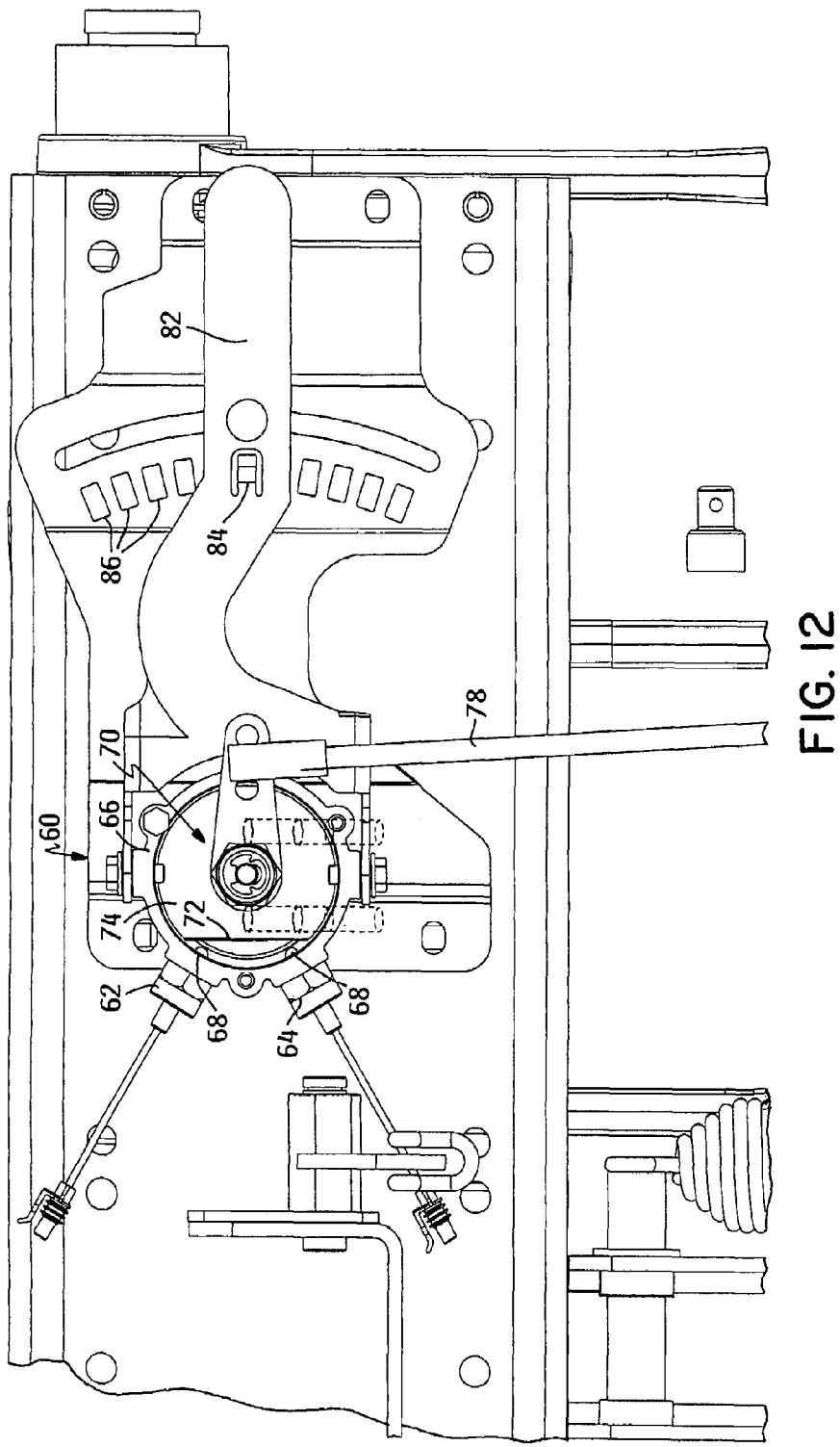
FIG. 12 is a front elevational view of a portion of the ground following control system shown in FIGS. 10 and 11, particularly illustrating the ground following control system in a position corresponding to passage of the aerator over relatively level ground such that the height of the coring head is not being adjusted.

The above description is for the case where aerator 2 travels on flat and level ground, then travels up a hill or incline, and then resumes travel on flat and level ground. In this case, we begin with a situation where neither limit switch 62 or 64 is actuated (as shown in FIG. 12) corresponding to passage over flat and level ground. When the hill or incline is encountered, second limit switch 64 is first actuated (as shown in FIG. 13) to raise coring head 24 until skid assembly 48 pivots back far enough to release second limit switch 64. Finally, when relatively flat and level ground is again encountered, first limit switch 62 will be actuated to lower the height of coring head 24 until first limit switch 62 is released. Thus, where aerator 2 goes from flat and level ground, up a hill or incline, and back to flat and level ground, control system 60 first raises the height of coring head 24 as it goes up the hill or incline and then lowers the height of coring head 24 when it reaches the end of the hill or incline and resumes travel over flat and level ground.

The reverse happens if aerator 2 is traveling on flat and level ground, then travels down a hill or incline, and then resumes travel on flat and level ground. In this case, when the hill or incline is encountered and skid assembly 48 begins to drop away from coring head 24, i.e. when skid assembly 48 rotates in the direction of the arrow D in FIG. 14, first limit switch 62 is actuated to begin lowering the height of coring head until first limit switch 62 is released. Then, when the hill or incline ends and flat and level ground is encountered, second limit switch 64 is actuated to restore the height of coring head 24. Thus, where aerator 2 goes from flat and level ground, down a hill or incline, and back to flat and level ground, control system 60 first lowers the height of coring head 24 as it goes down the hill or incline and then raises the height of coring head 24 when it reaches the end of the hill or incline and resumes travel over flat and level ground.

The nominal hole depth can be preset or preselected by the operator from a range of possible values. Switch housing 66 is selectively rotatable on coring head 24 to permit this selection. A handle 82 is attached to switch housing 66 and a tab 84 on handle 82 locks in one of a plurality of locking slots 86 provided on coring head 24. The operator can grab handle 82 and pull on handle 82 to unlock handle 82 from the locking slot 86 in which it was in engagement. The operator can then rotate handle 82, to rotate switch housing 66 on coring head 24, until tab 84 on locking handle 82 is in alignment with another slot 86. The operator can then release handle 82 to reengage tab 84 on handle 82 with the other slot 86 to relock handle 82 and switch housing 66 on coring head 24 in a rotatively adjusted position. The nominal hole depth provided when coring head 24 is traveling over flat and level ground can be thus be increased or decreased depending upon which slot 86 receives tab 84 on handle 82.

The Multi-Part Assembled Crankshaft

Crankshaft 28 used to reciprocate drive arms 34 up and down is not an integral, one-piece crankshaft, but is instead formed of a plurality of separate portions that may be splined and bolted together to form a single crankshaft that can be rotated by a single drive pulley 90. Crankshaft 28 is in two major left and right sections 92*l* and 92*r* each of which is capable of driving three drive arms 34. The left and right sections 92*l* and 92*r* of crankshaft 28 are joined together to operate as one crankshaft. The left and right sections are supported and carried by three spaced pillow blocks 94, i.e. a left pillow block 94*l*, a middle pillow block 94*m* and a right pillow block 94*r*, all fixed to the frame of coring head 24.

Each major section 92*l* and 92*r* of crankshaft 28 contains a plurality of arc shaped crank arms 96 having an off-axis hub 98 which is inserted through the upper end of one drive arm 34. Left section 92*l* of crankshaft 28 has three such arc shaped crank arms 96*a*, 96*b* and 96*c*. Right section 92*r* of crankshaft 28 has only two such arc shaped crank arm 96*a* and 96*b*, the third crank arm 96*c* in right section 92*r* of crankshaft 28 being replaced by an off axis hub 98 integrally carried on drive pulley 90 itself. Within each major section of crankshaft 28, the various crank arms 96 are bolted and splined together to rotate as one. Within each major section of crankshaft 28, a resilient coupler 100 is provided to help absorb and correct misalignment.

Figure 19:
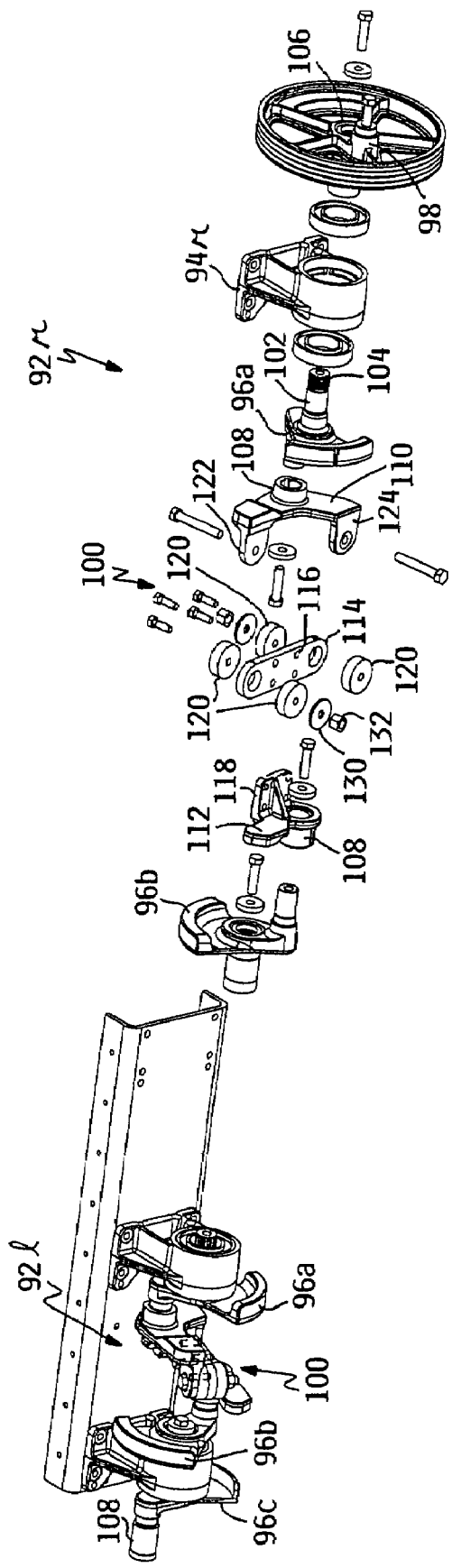
FIG. 19 is a partially exploded view of the multi-part crankshaft of the coring head of the aerator of FIG. 1, particularly illustrating one half of the crankshaft in an assembled condition and one half of the crankshaft in an exploded condition, particularly illustrating the crankshaft by looking at the crankshaft from one side thereof.

Referring to FIGS. 19 and 20, right section 92*r* of crankshaft 28 is shown disassembled. As noted earlier, drive pulley 90 includes an off axis hub 98 for journaling the outer right drive arm 34. A first crank arm 96*a* in right section 92*r* includes an on axis stem 102 that passes through right pillow block 94*r* and has a splined outer end 104 for being connected to a splined central hub 106 in drive pulley 90. As drive pulley 90 is rotated by belt drive 30, the splined connection between drive pulley 90 and the splined outer end 104 of first crank arm 96*a* rotates crankshaft 28 as well.

First crank arm 96*a* includes an off axis hub 98 around which the top end of the second or middle right drive arm 34 is journalled. Hub 98 is received inside a sleeve or hub 108 on a first part 110 of coupler 100 and is bolted thereto such that first crank arm 96*a* is fixed to first part 110 of coupler 100. The upper end of drive arm 34 includes a bearing that journals the upper end of drive arm 34 around hub 98 of first crank arm 96*a*. The bearing in drive arm 34 is clamped between first crank arm 96*a* and hub 108. The sleeve or hub 108 on first part 110 of coupler 100 is concentrically received around the off axis hub 98 of first crank arm 96*a* such that the off axis hub 98 of the first crank arm 98 is the hub which drives the middle right drive arm 34. When first part 110 of coupler 100 is connected to first crank arm 96a, they are rigid with one another.

Coupler 100 includes a second part 112 that is bolted to the off axis hub 98 of a second crank arm 96b. Again, the off axis hub 98 of second crank arm 96b passes into a sleeve or hub 108 on second part 112 of coupler 100. The top end of the inner right drive arm 34 is journalled around off axis hub 98 of second crank arm 96b in a manner similar to that described with respect to first crank arm 96a and the middle right drive arm 34. As was the case with first crank arm 96a and first part 110 of coupler 100, when second part 112 of coupler 100 is connected to second crank arm 96b, they are rigid with one another.

It would be possible to rigidly bolt or couple the first and second parts of coupler 100 together. However, this is not the preferred embodiment since alignment and assembly of the parts would become more difficult. Manufacturing tolerances would have to be more carefully controlled. Thus, a resilient connection is provided between the first and second parts 110 and 112 of coupler 100 to help absorb and correct any misalignment of parts created by manufacturing imprecision.

In this case, a rigid coupling plate 114 is provided having four central bolt holes 116 that may be bolted to a central flange 118 on second part 112 of coupler 100. The top and bottom of coupling plate 114 is provided with four rubber doughnut shaped cushions 120, two cushions 120 on the top and two cushions 120 on the bottom with one cushion being received on each side of coupling plate 114. First part 110 of coupler 100 is provided with top and bottom ears 122 and 124 each having a bolt hole 126. The top and bottom of coupling plate 114 and the rubber cushions 120 on either side thereof may be bolted by a bolt 128 to the top and bottom ears 122 and 124 of first part 110 of coupler 100 such that one cushion 120 is received between coupling plate 114 and each of the top and bottom ears 122 and 124 of first part 110 of coupler 100. The other cushion 120 in the stack is retained by a washer 130 and a nut 132.

In any event, when coupler 100 is installed and the bolts 128 are tightened, the coupling plate 114 is rigid with second part 112 of coupler 100 but is resilient relative to first part 110 of coupler 100 by virtue of the rubber cushion 120 carried between coupling plate 114 and each ear 122 and 124 of first part 110 of coupler 100. Thus, if there is misalignment between the first and second crank arms 96a and 96b, or between the first and second parts 110 and 112 of coupler 100, such misalignment will be taken up and absorbed by compression, as need be, of the rubber cushions 120.

Second crank arm 96b in right section 92r of crankshaft 28 is formed with an enlarged on-axis hub 134 that is received in middle pillow block 94m. This on-axis hub 134 is internally splined, similarly to the central on-axis hub 106 of drive pulley 90, to allow the splined outer end of the on-axis stem of first crank arm 96a in left section 92l of crankshaft 28 to be received therein. This is how the left and right sections 92l and 92r of crankshaft 28 are rotatively coupled together.

Left section 92l of crankshaft 28 contains the same assembly of first and second crank arms 96a and 96b with an interposed resilient coupler 100. Because left section 92l of crankshaft 28 lacks drive pulley 90 for connecting to the last drive arm 34, left section 92l of crankshaft 28 includes a third crank arm 96c outside of left pillow block 94l that is splined to second crank arm 96b in the same way first crank arm 96a in left section 92l is splined to second crank arm 96b in right section 92r. The third crank arm 96c is identical to first crank arm 96a in the left and right sections 92l and 92r. However, the off-axis hub 98 of the third crank arm 96c has an outer hub or sleeve 108 bolted thereto in place of the hubs or sleeves 108 that would normally have been provided by first part 110 of coupler 100.

To sum up and beginning at the right in FIGS. 19 and 20 and working to the left, the assembled, multi-part crankshaft 28 of this invention comprises: a) a first off-axis hub 98 on drive pulley 90 provided for the first drive arm 34, a second off-axis hub 98 provided on first crank arm 96a of right section 92r for the second drive arm 34, a third off-axis hub 98 provided on second crank arm 96b of right section 92r for the third drive arm 34 with a resilient coupler 100 between the first and second crank arms 96a and 96b of right section 92r, a fourth off-axis hub 98 provided on first crank arm 96a of left section 92l for the fourth drive arm 34, a fifth off-axis hub 98 provided on second crank arm 96b of left section 92l for the fifth drive arm 34 with another resilient coupler 100 between the first and second crank arms 96a and 96b of left section 92l, and a sixth off-axis hub 98 provided on a third crank arm 96c of left section 92l for the sixth drive arm 34. First crank arm 96a of right section 92r, first crank arm 96a of left section 92l and the third crank arm of left section 92l are identical to one another. Second crank arm 96b of right section 92r and second crank arm 96b of left section 92l are identical to one another. Couplers 100 are mirror images of one another. Crankshaft 28 is assembled by splining and bolting the various parts together as described herein and as shown in the drawings Each drive arm 34 is journalled on its respective hubs, i.e. the off-axis hub 98 of each crank arm 96 plus the off-axis hub 98 on drive pulley 90, using a sealed bearing. Thus, the bearings used to journal drive arms 34 need not be specially lubricated. The bearings can be replaced since each left or right section 92l and 92r of crankshaft 28 can be disassembled and taken apart by first disassembling coupler 100 to allow the first and second crank arms 96a and 96b contained between two adjacent pillow blocks to be slid apart relative to one another and removed. This eases the cost and expense of manufacturing and maintaining crankshaft 28.

Crankshaft 28 can be driven by a single drive pulley 90. This is also advantageous since it involves only one pulley and no timing belts need be used as would be the case if multiple pulleys 90 were used to drive separate multiple crankshafts for smaller groupings of tine assemblies 26. Being able to drive six tine assemblies 26 with one crankshaft 28 driven by one drive pulley 90 is advantageous. Being able to disassemble such a crankshaft 28 and to use sealed bearings between drive arms 34 and the crank arms of the crankshaft 28 is also advantageous.

The Integral Core Deflector

Each drive arm 34 contains a curved surface 140 extending upwardly and rearwardly relative to tine holder 38. The purpose of this curved surface 140 is to deflect soil cores exiting from the top of top eject hollow coring tines 32 onto ground 6. In aerator 2 of this invention, the curved core deflector formed by curved surface 140 is conveniently and integrally formed on drive arm 34. Thus, separate core deflectors 140 need not be provided and bolted to the lower ends of drive arms 34 as in prior art aerators.

The U-Shaped Connecting Link

Connecting links 42 that connect the lower ends of drive arms 34 to frame 4 of coring head 24 are U-shaped with the ends of the U forming the pivotal connection points of connecting links 42. One end of connecting link 42 connects to drive arm 34 ahead of drive arm 34 and tine assembly 26 at pivot pin 40. Connecting link 42 then extends rearwardly so that the other end of connecting link 42 connects to biasing link 44 on the opposite side of drive arm 34 and tine assembly 26. Connecting link 42 extends across drive arm 34 and tine assembly 26 between the first and second ends of connecting link 42.

The configuration of connecting link 42 and particularly how it extends across drive arms 34 and tine assembly 26 between its first and second ends is advantageous in that it decreases the front to back depth of coring head 24 from prior art aerators. In prior art aerators, connecting links 42 and the biasing link 44 would all have been located on the same side of drive arm 34 as the first pivot pin 40, greatly increasing the depth of coring head 24.

Various modifications of this invention will be apparent to those skilled in the art. Accordingly, this invention will be limited only by the appended claims.

I claim:

1. An aerator for punching a plurality of holes in the ground, which comprises:
   (a) a frame supported for movement over the ground by a plurality of wheels;
   (b) a coring head carried on the frame, the coring head having a plurality of side-by-side tine assemblies that are vertically reciprocal for punching holes in the ground, the tine assemblies being vertically reciprocated by a plurality of drive arms with one drive arm reciprocating one tine assembly; and
   (c) a linkage for connecting each drive arm to the coring head, the linkage comprising a pivotal connecting link connected at a first end to the drive arm and at a second end to a first end of a biasing link, the biasing link having a second end resiliently and pivotally connected to the coring head, the first end of the connecting link connecting to the drive arm on one side of the drive arm and the tine assembly, the connecting link then extending across the drive arm so that the second end of the connecting link connects to the biasing link on an opposite side of the drive arm and the tine assembly to decrease front to back depth of the coring head.

2. The aerator of claim 1, wherein the connecting link has a U-shape that faces downwardly towards the ground.

3. The aerator of claim 1, wherein the aerator is a walk aerator having a handle assembly for allowing a walking operator to guide and steer the frame.

4. An aerator for punching a plurality of holes in the ground, which comprises:
   (a) a frame supported for movement over the ground by a plurality of wheels;
   (b) a coring head carried on the frame, the coring head having a plurality of side-by-side tine assemblies that are vertically reciprocal for punching holes in the ground, the tine assemblies being vertically reciprocated relative to the coring head and relative to the ground by a plurality of drive arms, wherein each tine assembly is vertically reciprocated by only a single drive arm, and wherein each tine assembly comprises a plurality of tines held within a holder with the holder being rigidly affixed to a lower end of the single drive arm; and
   (c) a linkage for connecting each drive arm to the coring head, the linkage comprising a pivotal connecting link connected at a first end to the drive arm and at a second end to the coring head, the first end of the connecting link connecting to the drive arm on one side of the drive arm and the tine assembly, the connecting link then extending across the drive arm so that the second end of the connecting link connects to the coring head on an opposite side of the drive arm and the tine assembly to decrease front to back depth of the coring head.

5. The aerator of claim 4, wherein the first and second vertical legs of the connecting links are approximately equal in length.

6. The aerator of claim 5, wherein the first and second vertical legs of the connecting link are shorter than the horizontal upper leg of the connecting link.

7. An aerator for punching a plurality of holes in the ground, which comprises:
   (a) a frame supported for movement over the ground by a plurality of wheels;
   (b) a coring head carried on the frame, the coring head having a plurality of side-by-side tine assemblies that are vertically reciprocal for punching holes in the ground, the tine assemblies being vertically reciprocated by a plurality of drive arms with one drive arm reciprocating one tine assembly; and
   (c) a linkage for connecting each drive arm to the coring head, the linkage comprising a pivotal connecting link connected at a first end to the drive arm and at a second end to the coring head, the connecting link having a downwardly facing U-shape comprising a first substantially vertical leg having a lower end that comprises the first end of the connecting link, a second substantially vertical leg having a lower end that comprises the second end of the connecting link, and a generally horizontal upper leg that bridges between and joins the first and second vertical legs, and wherein the first end of the connecting link connects to the drive arm on one side of the drive arm and the tine assembly, the generally horizontal upper leg of the connecting link then extends across the drive arm, and the second end of the connecting link connects to the coring head on an opposite side of the drive arm and the tine assembly to decrease front to back depth of the coring head.

* * * * *

UNITED STATES PATENT AND TRADEMARK OFFICE
CERTIFICATE OF CORRECTION

PATENT NO. : 7,472,759 B2  Page 1 of 1
APPLICATION NO. : 11/975277
DATED : January 6, 2009
INVENTOR(S) : Walter J. Petersen It is certified that error appears in the above-identified patent and that said Letters Patent is hereby corrected as shown below:

Col. 12, Line 18, change "claim 4" to --claim 7--.

Signed and Sealed this

Twenty-eighth Day of April, 2009

JOHN DOLL
*Acting Director of the United States Patent and Trademark Office*